(12) United States Patent
Visscher et al.

(10) Patent No.: US 11,960,072 B2
(45) Date of Patent: Apr. 16, 2024

(54) MULTI-MODAL MICROSCOPIC IMAGING

(71) Applicant: Inscopix, Inc., Palo Alto, CA (US)

(72) Inventors: Koen Visscher, Tucson, AZ (US); Pei Sabrina Xu, San Francisco, CA (US); Shay Neufeld, Palo Alto, CA (US)

(73) Assignee: INSCOPIX, INC., Palo Alto, CA (US)

( * ) Notice: Subject to any disclaimer, the term of this patent is extended or adjusted under 35 U.S.C. 154(b) by 317 days.

(21) Appl. No.: 17/481,123

(22) Filed: Sep. 21, 2021

(65) Prior Publication Data
US 2022/0099954 A1   Mar. 31, 2022

Related U.S. Application Data

(63) Continuation of application No. PCT/US2020/026730, filed on Apr. 3, 2020.
(Continued)

(51) Int. Cl.
*G02B 21/36* (2006.01)
*G02B 21/18* (2006.01)
(Continued)

(52) U.S. Cl.
CPC ........... *G02B 21/367* (2013.01); *G02B 21/18* (2013.01); *G06N 3/08* (2013.01); *G06T 7/37* (2017.01);
(Continued)

(58) Field of Classification Search
CPC .. G02B 21/0076; G02B 21/18; G02B 21/362; G02B 21/367; G02B 2207/114; G06T 2207/10056
See application file for complete search history.

(56) References Cited

U.S. PATENT DOCUMENTS

| 4,244,634 A | 1/1981 | Dianetti et al. |
| 4,605,287 A | 8/1986 | Lang et al. |

(Continued)

FOREIGN PATENT DOCUMENTS

| EP | 2609742 A2 | 7/2013 |
| EP | 3350578 A1 | 7/2018 |

(Continued)

OTHER PUBLICATIONS

"Multiphoton Fluorescence Microscopy with GRIN Objective Aberration Correction by Low Order Adaptive Optics"—Bortoletto et al., PLoS One. www.plosone.org; Jul. 2011, vol. 6, Issue 7. (Year: 2011).*

(Continued)

*Primary Examiner* — Mainul Hasan
(74) *Attorney, Agent, or Firm* — Quarles & Brady LLP; Yakov S. Sidorin

(57) ABSTRACT

An adapter configured to be optically coupled to a plurality of microscopes. The adapter includes a) a first microscope interface configured to optically couple a first microscope to an optical element in optical communication with an optical probe; b) a second microscope interface configured to optically couple a second microscope to the optical element in optical communication with the optical probe; and c) an optical arrangement configured to direct light collected from a sample with aid of the optical probe to (1) the first microscope and second microscope simultaneously, or (2) the first microscope or second microscope selectively.

52 Claims, 16 Drawing Sheets

Related U.S. Application Data

(60) Provisional application No. 62/829,276, filed on Apr. 4, 2019.

(51) Int. Cl.
  *G06N 3/08* (2023.01)
  *G06T 7/37* (2017.01)
  *G06T 11/60* (2006.01)

(52) U.S. Cl.
  CPC .... *G06T 11/60* (2013.01); *G06T 2207/10056* (2013.01)

(56) References Cited

U.S. PATENT DOCUMENTS

| | | | |
|---|---|---|---|
| 5,349,468 | A | 9/1994 | Rathbone et al. |
| 6,466,366 | B1 | 10/2002 | Dominique |
| 8,270,071 | B2 | 9/2012 | Glaser et al. |
| 8,346,346 | B1 | 1/2013 | Schnitzer et al. |
| 8,788,021 | B1 | 7/2014 | Flusberg et al. |
| 9,161,694 | B2 | 10/2015 | Schnitzer et al. |
| 9,195,043 | B2 | 11/2015 | Ghosh et al. |
| 9,474,448 | B2 | 10/2016 | Ghosh et al. |
| 9,498,135 | B2 | 11/2016 | Ghosh et al. |
| 9,629,554 | B2 | 4/2017 | Ghosh et al. |
| 9,636,020 | B2 | 5/2017 | Flusberg et al. |
| 9,839,361 | B2 | 12/2017 | Schnitzer et al. |
| 10,200,657 | B2 | 2/2019 | Ghosh |
| 10,386,623 | B2 | 8/2019 | Visscher et al. |
| 10,682,197 | B2 | 6/2020 | Trulson et al. |
| 10,813,552 | B2 | 10/2020 | Ghosh et al. |
| 10,908,405 | B2 | 2/2021 | Trulson et al. |
| 2002/0135871 | A1 | 9/2002 | Vodyanoy et al. |
| 2005/0237605 | A1 | 10/2005 | Vodyanoy et al. |
| 2006/0092503 | A1 | 5/2006 | Saunders |
| 2009/0244545 | A1 | 10/2009 | Toida et al. |
| 2010/0097692 | A1 | 4/2010 | Glaser et al. |
| 2010/0104197 | A1* | 4/2010 | Sohma ............... G06F 16/532 382/284 |
| 2011/0260720 | A1 | 10/2011 | Fischer et al. |
| 2013/0100271 | A1 | 4/2013 | Howes et al. |
| 2013/0148106 | A1* | 6/2013 | Tearney ............. A61B 5/0066 356/72 |
| 2013/0260382 | A1 | 10/2013 | Ghosh et al. |
| 2014/0023993 | A1* | 1/2014 | Zeng .................. A61B 18/18 606/9 |
| 2014/0043462 | A1 | 2/2014 | Ghosh et al. |
| 2014/0321772 | A1 | 10/2014 | Pichéet al. |
| 2015/0301029 | A1 | 10/2015 | Eggan et al. |
| 2015/0309295 | A1* | 10/2015 | Cocker ............... G02B 21/362 600/476 |
| 2016/0374562 | A1* | 12/2016 | Vertikov ............. A61B 5/0095 600/424 |
| 2018/0074306 | A1 | 3/2018 | Visscher et al. |
| 2018/0202935 | A1* | 7/2018 | Bahlman ........... G02B 21/0076 |
| 2018/0217364 | A1 | 8/2018 | Cocker et al. |
| 2018/0220106 | A1 | 8/2018 | Ghosh |
| 2018/0296074 | A1 | 10/2018 | Trulson et al. |
| 2018/0303573 | A1 | 10/2018 | Trulson et al. |
| 2018/0356624 | A1 | 12/2018 | Isobe et al. |
| 2019/0133449 | A1 | 5/2019 | Flusberg et al. |
| 2019/0133453 | A1 | 5/2019 | Schnitzer et al. |
| 2019/0356884 | A1 | 11/2019 | Ghosh |
| 2020/0057290 | A1 | 2/2020 | Visscher et al. |
| 2021/0029329 | A1 | 1/2021 | Ghosh |
| 2021/0059578 | A1 | 3/2021 | Nassi et al. |
| 2021/0059782 | A1 | 3/2021 | Trulson et al. |
| 2021/0118144 | A1* | 4/2021 | Li ..................... G06T 7/0012 |
| 2021/0141204 | A1 | 5/2021 | Visscher et al. |
| 2021/0247603 | A1 | 8/2021 | Trulson et al. |
| 2021/0267458 | A1 | 9/2021 | Ghosh et al. |

FOREIGN PATENT DOCUMENTS

| | | | |
|---|---|---|---|
| EP | 3371572 A1 | 9/2018 | |
| EP | 3513238 A1 | 7/2019 | |
| WO | WO-2011149972 A2 * | 12/2011 | ........... A61B 5/0066 |
| WO | WO-2012027586 A2 | 3/2012 | |
| WO | WO-2013119838 A1 | 8/2013 | |
| WO | WO-2013126271 A1 | 8/2013 | |
| WO | WO-2014071390 A1 | 5/2014 | |
| WO | WO-2015079268 A1 | 6/2015 | |
| WO | WO-2017041044 A1 | 3/2017 | |
| WO | WO-2017070610 A1 | 4/2017 | |
| WO | WO-2017079688 A1 | 5/2017 | |
| WO | WO-2018052788 A1 | 3/2018 | |
| WO | WO-2019032723 A1 | 2/2019 | |
| WO | WO-2019183634 A1 | 9/2019 | |
| WO | WO-2020206362 A1 | 10/2020 | |

OTHER PUBLICATIONS

Co-pending U.S. Appl. No. 14/213,776, inventors Ghosh; Kunal et al., filed Mar. 14, 2014.
Co-pending U.S. Appl. No. 15/331,549, inventors Trulson; Mark O. et al., filed Oct. 21, 2016.
Co-pending U.S. Appl. No. 15/344,061, inventors Trulson; Mark O. et al., filed Nov. 4, 2016.
Co-pending U.S. Appl. No. 15/403,819, inventor Ghosh; Kunal, filed Jan. 11, 2017.
Co-pending U.S. Appl. No. 15/443,999, inventors Flusberg; Benjamin A. et al., filed Feb. 27, 2017.
Co-pending U.S. Appl. No. 15/830,894, inventors Schnitzer; Mark J. et al., filed Dec. 4, 2017.
Co-pending U.S. Appl. No. 17/316,394, inventor Ghoshkunal, filed May 10, 2021.
Co-pending U.S. Appl. No. 17/484,791, inventors Trulsonmark; O. et al., filed Sep. 24, 2021.
Edwards et al. Light-Activated Cre Recombinase as a Tool for the Spatial and Temporal Control of Gene Function in Mammalian Cells. ACS Chem. Biol., 2009, 4 (6), pp. 441-445.
EP17851341.2 Supplementary European Search Report dated Apr. 6, 2020.
International Search Report and Written Opinion dated Nov. 22, 2017 for International PCT Patent Application No. PCT/US2017/050437.
Maes et al. Multimodality image registration by maximization of mutual information. IEEE Trans Med Imaging. Apr. 1997;16(2):187-98.
Nihongaki et al. Photoactivatable CRISPR-Cas9 for optogenetic genome editing. Nat Biotechnol. Jul. 2015;33(7):755-60.
Office Action dated Nov. 26, 2018 for U.S. Appl. No. 15/697,702.
PCT/US2020/026730 International Search Report dated Jul. 1, 2020.
Polstein et al. A light-inducible CRISPR/Cas9 system for control of endogenous gene activation. Nat Chem Biol. Mar. 2015; 11(3): 198-200.
Sorzano et al. Elastic registration of biological images using vector-spline regularization. IEEE Trans Biomed Eng. Apr. 2005;52(4):652-63.
U.S. Appl. No. 15/697,702 Notice of Allowance dated Apr. 24, 2019.
U.S. Appl. No. 16/442,750 Office Action dated May 27, 2020.
Yu, et al. Interaction between bevacizumab and murine VEGF-A: a reassessment. Invest Ophthalmol Vis Sci. Feb. 2008;49(2):522-7.

* cited by examiner

527x450 pixels; 32-bit; 926k

523x524 pixels; 32-bit; 1 MB

MULTI-MODAL MICROSCOPIC IMAGING

CROSS-REFERENCE

This application is a continuation of International Application No. PCT/US20/26730, filed Apr. 3, 2020, which claims priority to U.S. Provisional Patent Application No. 62/829,276 filed on Apr. 4, 2019, each of which applications is entirely incorporated herein by reference for all purposes.

BACKGROUND

The disclosed invention relates to microscope systems for in vitro and in vivo imaging, and specifically to an adapter that facilitates alignment of images captured by two or more microscopes used to simultaneously or sequentially image a sample or subject. In some instances, the adapter may be used with microscope systems that can be mounted on live subjects for in vivo imaging of, for example, brain tissue.

SUMMARY

Disclosed herein are adapters configured to be optically coupled to a plurality of microscopes, said adapters comprising: a) a first microscope interface configured to optically couple a first microscope to an optical element in optical communication with an optical probe; b) a second microscope interface configured to optically couple a second microscope to the optical element in optical communication with the optical probe; and c) an optical arrangement configured to direct light collected from a sample with aid of the optical probe to (1) the first microscope and second microscope simultaneously, or (2) the first microscope or second microscope selectively.

In some embodiments, the first microscope is a one-photon microscope. In some embodiments, the second microscope is a two-photon microscope. In some embodiments, the first microscope and the second microscope are of different types. In some embodiments, the first microscope interface is configured to permit the first microscope to contact a housing of the adapter. In some embodiments, the first microscope interface is configured to permit the adapter to bear the weight of the first microscope. In some embodiments, the first microscope weighs 20 grams or less. In some embodiments, the first microscope has a volume of 30 $cm^3$ or less. In some embodiments, the second microscope interface is configured to permit the second microscope to contact a housing of the adapter. In some embodiments, the second microscope interface is configured to permit the second microscope to bear the weight of the adapter. In some embodiments, the first microscope interface and the second microscope interface are provided on a housing. In some embodiments, the first microscope interface and the second microscope interface are provided on different sides of the housing. In some embodiments, at least a portion of the optical probe extends out of the housing. In some embodiments, the optical element is contained within the housing. In some embodiments, the optical probe is attachable and separable from the adapter. In some embodiments, the optical probe comprises a GRIN lens. In some embodiments, the optical element in optical communication with the optical probe is a mirror. In some embodiments, the mirror is configured to rotate about an axis when the optical arrangement is configured to direct the light to the first microscope or second microscope selectively. In some embodiments, the mirror is configured to translate linearly when the optical arrangement is configured to direct light to the first microscope or second microscope. In some embodiments, the optical element is a beamsplitter when the optical arrangement is configured to direct the light to the first microscope and the second microscope simultaneously. In some embodiments, the first microscope and the second microscope are configured to generate images based on the light collected from the sample. In some embodiments, the adapter is configured to cause an image generated by the first microscope and an image generated by the second microscope to align. In some embodiments, the first microscope interface and the second adapter interface allow the adapter to be coupled and decoupled from the first microscope and the second microscope. In some embodiments, the second microscope interface is configured to allow the adapter to be coupled to a plurality of different types of microscopes. In some embodiments, the second microscope interface and the second adapter interface comprise threaded features that mate with each other. In some embodiments, the first microscope interface is configured to be directly connected to an objective lens of the first microscope. In some embodiments, the second microscope interface is configured to be directly connected to an objective lens of the second microscope. In some embodiments, the adapter further comprises a compensator to correct for beam shift and improve a positional accuracy of a stimulation light beam as it impinges on a target region within a field-of-view of the first microscope or the second microscope. In some embodiments, the compensator is a fixed component of the adapter and is oriented at a 45° angle relative to the axis of the stimulation light beam. In some embodiments, the compensator is installed in one position of a multi-position mirror holder which further comprises a dichroic reflector in a different position. In some embodiments, the multi-position mirror holder is a rotary mirror wheel or a linear slider.

Also disclosed herein are adapters configured to be optically coupled to a first microscope and a second microscope, said adapters comprising: a) a first objective lens configured to be optically coupled to the first microscope; b) a second objective lens configured to be optically coupled to an optical probe; and c) an optical arrangement configured to direct light collected from a sample with aid of the optical probe to the first objective lens and an interface configured to optically couple the second microscope (1) simultaneously, or (2) selectively at different times.

In some embodiments, the first objective lens is an infinity corrected lens. In some embodiments, the first objective lens and the second objective lens have at least one different optical property. In some embodiments, the first objective lens and the second objective lens have different optical axes. In some embodiments, the first objective lens has a first optical axis and the second objective lens has a second optical axis that is substantially perpendicular to the first optical axis. In some embodiments, the first objective lens is supported by a housing of the adapter. In some embodiments, the second objective lens is supported by a housing of the adapter. In some embodiments, the second objective lens is supported on a different side of the housing than the first objective lens. In some embodiments, the first objective lens has a diameter of about 5 cm or less. In some embodiments, the first objective lens has a numerical aperture of 0.95 or less. In some embodiments, the first objective lens has a working distance of 20 mm or less. In some embodiments, the second objective lens has a diameter of about 5 cm or less. In some embodiments, the second objective lens has a numerical aperture of 0.95 or less. In some embodiments, the second objective lens has a working distance of 20 mm or less. In some embodiments, the optical probe and the second objective lens are in optical alignment. In some embodiments, the optical probe is attachable and separable from the adapter. In some embodiments, the optical probe comprises a GRIN lens. In some embodiments, the optical arrangement comprises an optical element in optical communication with the first objective lens and the interface. In some embodiments, the optical element is a mirror. In some embodiments, the mirror is configured to rotate about an axis when the optical arrangement is configured to direct the light to the first objective lens and the interface selectively at different times. In some embodiments, the optical element is a beamsplitter when the optical arrangement is configured to direct the light to the first objective lens and the interface simultaneously. In some embodiments, the first microscope and the second microscope are configured to generate images based on the light collected from the sample. In some embodiments, the adapter is configured to cause an image generated by the first microscope and an image generated by the second microscope to align. In some embodiments, the adapter further comprises a compensator to correct for beam shift and improve a positional accuracy of a stimulation light beam as it impinges on a target region within a field-of-view of the first microscope or the second microscope. In some embodiments, the compensator is a fixed component of the adapter and is oriented at a 45° angle relative to the axis of the stimulation light beam. In some embodiments, the compensator is installed in one position of a multi-position mirror holder which further comprises a dichroic reflector in a different position. In some embodiments, the multi-position mirror holder is a rotary mirror wheel or a linear slider.

Disclosed herein are adapters configured to be optically coupled to a plurality of microscopes, said adapters comprising: a) a housing having a volume of less than about 2,000 cubic centimeters; b) a plurality of microscope interfaces configured to permit at least a first microscope and a second microscope to be simultaneously in optical communication with an optical element; and c) an optical arrangement comprising the optical element, said optical arrangement at least partially contained within the housing and configured to direct light collected from a sample with aid of an optical probe to the first microscope or the second microscope.

In some embodiments, the first microscope is a one-photon microscope. In some embodiments, the second microscope is a two-photon microscope. In some embodiments, the first microscope and the second microscope are of different types. In some embodiments, the plurality of microscope interfaces is configured to permit the first microscope or the second microscope to contact the housing of the adapter. In some embodiments, at least one of the plurality of microscope interfaces is configured to permit the adapter to bear weight of the first microscope. In some embodiments, at least one of the plurality of microscope interfaces is configured to permit the second microscope to bear weight of the adapter. In some embodiments, the housing comprises a probe interface configured to permit the optical probe to be attachable and separable from the adapter. In some embodiments, at least part of the optical probe extends from the housing. In some embodiments, the optical probe comprises a GRIN lens. In some embodiments, the optical arrangement comprises a mirror at least partially enclosed within the housing. In some embodiments, the first microscope and the second microscope are configured to generate images based on the light collected from the sample. In some embodiments, the adapter is configured to cause an image generated by the first microscope and an image generated by the second microscope to align. In some embodiments, the adapter further comprises a compensator to correct for beam shift and improve a positional accuracy of a stimulation light beam as it impinges on a target region within a field-of-view of the first microscope or the second microscope. In some embodiments, the compensator is a fixed component of the adapter and is oriented at a 45° angle relative to the axis of the stimulation light beam. In some embodiments, the compensator is installed in one position of a multi-position mirror holder which further comprises a dichroic reflector in a different position. In some embodiments, the multi-position mirror holder is a rotary mirror wheel or a linear slider.

Disclosed herein are adapters configured to be optically coupled to a plurality of microscopes, said adapters comprising: a) a housing; b) a plurality of microscope interfaces configured to permit at least a first microscope and a second microscope to be simultaneously in optical communication with an optical element; and c) an optical arrangement comprising the optical element, said optical arrangement at least partially contained within the housing and configured to direct light collected from a sample with aid of an optical probe to the first microscope or the second microscope.

In some embodiments, the housing and the optical arrangement collectively weigh less than about 1 kilogram. In some embodiments, the first microscope is a one-photon microscope. In some embodiments, the second microscope is a two-photon microscope. In some embodiments, the first microscope and the second microscope are of different types. In some embodiments, the plurality of microscope interfaces is configured to permit the first microscope or the second microscope to contact the housing of the adapter. In some embodiments, at least one of the plurality of microscope interfaces is configured to permit the adapter to bear weight of the first microscope. In some embodiments, at least one of the plurality of microscope interfaces is configured to permit the second microscope to bear weight of the adapter. In some embodiments, the housing comprises a probe interface configured to permit the optical probe to be attachable and separable from the adapter. In some embodiments, at least part of the optical probe extends from the housing. In some embodiments, the optical probe comprises a GRIN lens. In some embodiments, the optical arrangement comprises a mirror at least partially enclosed within the housing. In some embodiments, the first microscope and the second microscope are configured to generate images based on the light collected from the sample. In some embodiments, the adapter is configured to cause an image generated by the first microscope and an image generated by the second microscope to align. In some embodiments, the housing, optical elements of the optical arrangement, and the first microscope collectively weigh less than about 1 kilogram. In some embodiments, the adapter further comprises a compensator to correct for beam shift and improve a positional accuracy of a stimulation light beam as it impinges on a target region within a field-of-view of the first microscope or the second microscope. In some embodiments, the compensator is a fixed component of the adapter and is oriented at a 45° angle relative to the axis of the stimulation light beam. In some embodiments, the compensator is installed in one position of a multi-position mirror holder which further comprises a dichroic reflector in a different position. In some embodiments, the multi-position mirror holder is a rotary mirror wheel or a linear slider.

Disclosed herein are adapters configured to be optically coupled to a plurality of microscopes, said adapters comprising: a) a housing; b) a plurality of microscope interfaces configured to permit at least a first microscope and a second microscope to be in optical communication with an optical element; and c) an optical arrangement comprising the optical element, said optical arrangement at least partially contained within the housing and configured to direct light collected from a sample with aid of an optical probe to the first microscope or the second microscope.

In some embodiments, the adapter is configured to support a weight of the first microscope or the second microscope. In some embodiments, the first microscope is a one-photon microscope. In some embodiments, the one-photon microscope is a miniature microscope. In some embodiments, the one-photon microscope comprises a weight equal to or less than 5 gr. In some embodiments, the one-photon microscope comprises a light source and an image sensor. In some embodiments, the second microscope is a two-photon microscope. In some embodiments, the adapter is configured to support the first microscope or the second microscope in its entirety. In some embodiments, the first microscope and the second microscope are of different types. In some embodiments, the plurality of microscope interfaces is configured to permit the first microscope or the second microscope to contact the housing of the adapter. In some embodiments, at least one of the plurality of microscope interfaces is configured to permit the adapter to bear weight of the first microscope. In some embodiments, at least one of the plurality of microscope interfaces is configured to permit the second microscope to bear weight of the adapter. In some embodiments, the housing comprises a probe interface configured to permit the optical probe to be attachable and separable from the adapter. In some embodiments, at least part of the optical probe extends from the housing. In some embodiments, the optical probe comprises a GRIN lens. In some embodiments, the optical arrangement comprises a mirror at least partially enclosed within the housing. In some embodiments, the first microscope and the second microscope are configured to generate images based on the light collected from the sample. In some embodiments, the adapter is configured to cause an image generated by the first microscope and an image generated by the second microscope to align. In some embodiments, the adapter further comprises a compensator to correct for beam shift and improve a positional accuracy of a stimulation light beam as it impinges on a target region within a field-of-view of the first microscope or the second microscope. In some embodiments, the compensator is a fixed component of the adapter and is oriented at a 45° angle relative to the axis of the stimulation light beam. In some embodiments, the compensator is installed in one position of a multi-position mirror holder which further comprises a dichroic reflector in a different position. In some embodiments, the multi-position mirror holder is a rotary mirror wheel or a linear slider.

Disclosed herein are methods for selectively exciting optogenetically-modified neurons in a tissue sample, the method comprising: a) providing the adapter of any one of the previous claims, wherein the first microscope is a one-photon microscope, the second microscope is a two-photon microscope, and the optical probe is in optical communication with the tissue sample; and b) using the two-photon microscope to deliver a train of temporally focused laser pulses to selectively excite individual optogenetically-modified neurons, or sub-cellular compartments thereof.

In some embodiments, the first microscope is a one-photon epifluorescence microscope. In some embodiments, the first microscope is a miniature microscope having a weight of 4 grams or less. In some embodiments, the first microscope is a miniature microscope having a volume of 500 $mm^3$ or less. In some embodiments, the method further comprises the use of real-time bandpass filtering of a series of images captured by the one-photon microscope to facilitate focusing.

Also disclosed herein are methods for performing light-controlled genome editing in a subset of cells within a tissue sample, the methods comprising: a) providing the adapter of any one of the previous claims, wherein the optical probe is in optical communication with the tissue sample, and wherein the first microscope is used to image the tissue sample; and b) using the second microscope to trigger a light-activated CRISPR-based or Cre recombinase-based transcription system for performing light-controlled genome editing in the subset of cells within the tissue sample.

In some embodiments, the first microscope is a one-photon epifluorescence microscope. In some embodiments, the first microscope is a miniature microscope having a weight of 4 grams or less. In some embodiments, the first microscope is a miniature microscope having a volume of 500 $mm^3$ or less. In some embodiments, the method further comprises the use of real-time bandpass filtering of a series of images captured by the first microscope to facilitate focusing.

Disclosed herein are methods for enhancing the accuracy of alignment of images captured by a one-photon microscope and a two-photon microscope, the methods comprising: a) providing the adapter of any one of the previous claims, wherein the first microscope is a one-photon microscope, and the second microscope is a two-photon microscope; b) projecting a series of images captured by the one-photon microscope into a single image; c) applying a bandpass filter to the projected image created in step (b) to remove low frequency background and high frequency noise; d) identifying a subset of images selected from a z-stack of two-photon optical image slices that overlap with the focal depth of the one-photon image by: (i) generating a moving projection of two-photon optical image slices, wherein the number of two-photon optical image slices included in the projection is determined by dividing the focal depth of the one-photon image by the thickness of the two-photon optical image slice, and wherein the starting optical image slice for the subset of two-photon optical slices included in the moving projection is incremented by a value of one for each sequential projection; (ii) applying the same bandpass filter as used in step (c) to each of the two-photon projections created in step (d)(i); and (iii) calculating the cross-correlation between the filtered one-photon image of step (c) with each of the filtered two-photon projection images of step (d)(ii) to identify that which is best correlated with the one-photon image; (e) applying an elastic registration algorithm to the filtered one-photon image of step (c) and the filtered two-photon projection image identified in step (d)(iii) to generate a set of coordinate transformations; and (f) applying the coordinate transformation to the filtered one-photon image of step (c) or the filtered two-photon projection image identified in step (d)(iii) to align the images. Any description herein of two-photon microscopes may be applied to any two-photon, confocal, or any type of bench-top microscopes that may utilize a head-fix of subjects. In some instances, an adapter and/or any image alignment methods described herein need not be constrained between a one-photon and two-photon microscope, but may be applied to freely-moving imaging by a microscope that allows free movement of a subject, and head-fixing imaging by a broad imaging modality that may use head fixation of subjects.

In some embodiments, the method further comprises the use of real-time bandpass filtering of a series of images captured by the one-photon microscope to facilitate focusing. In some embodiments, the elastic registration algorithm is a vector-spline regularization algorithm.

In another aspect, the present disclosure provides methods for multi-modal imaging using a plurality of microscopes. The method may comprise: a) receiving a functional imaging data and structural imaging data from an adapter comprising (i) a first microscope interface configured to optically couple a first microscope to an optical element in optical communication with an optical probe to provide the functional imaging data of a sample, and (ii) a second microscope interface configured to optically couple a second microscope to the optical element in optical communication with the optical probe to provide the structural imaging data of the sample; b) processing the received functional imaging data to generate a first overlaid image; c) processing the structural imaging data to generate a second overlaid image; and d) generating a third overlay of the first overlaid image and the second overlaid image.

In some embodiments, the first overlaid image may be generated by obtaining a first cell map, constructing a structural image from a mean projection of a motion corrected movie, and overlaying the cell map with the structural image. In some embodiments, the second overlaid image may be generated by obtaining structural data, using the structural data to generate a 2p/confocal structural image, obtaining functional data, using the functional data to generate a 2p/confocal functional image, and overlaying the 2p/confocal structural image and the 2p/confocal functional image.

In some embodiments, the method may further comprise co-registering the first overlaid image and the second overlaid image prior to generating the third overlay. In some embodiments, the first overlaid image may be set to a first color channel, and the second overlaid image may be set to a second color channel different from the first color channel when generating the third overlay.

In some embodiments, the first microscope may be a one-photon microscope. In some embodiments, the second microscope may be a two-photon microscope. In some embodiments, the second microscope may be a confocal microscope. In some embodiments, the first microscope and the second microscope may be of different types. In some embodiments, the first microscope interface may be configured to permit the adapter to bear the weight of the first microscope. In some embodiments, the first microscope may weigh 20 grams or less. In some embodiments, the first microscope may have a volume of 30 cm$^3$ or less. In some embodiments, the second microscope interface may be configured to permit the second microscope to bear the weight of the adapter.

In some embodiments, the first microscope interface and the second microscope interface may be provided on a housing. In some embodiments, the first microscope interface and the second microscope interface may be provided on different sides of the housing. In some embodiments, at least a portion of the optical probe may extend out of the housing. In some embodiments, the optical element may be contained within the housing. In some embodiments, the optical probe may be attachable and separable from the adapter. In some embodiments, the optical probe may comprise a GRIN lens. In some embodiments, the first microscope and the second microscope may be configured to generate images based on light collected from the sample. In some embodiments, the adapter may be configured to cause an image generated by the first microscope and an image generated by the second microscope to align. In some embodiments, the first microscope interface and the second adapter interface may allow the adapter to be coupled and decoupled from the first microscope and the second microscope. In some embodiments, the second microscope interface may be configured to allow the adapter to be coupled to a plurality of different types of microscopes. In some embodiments, the first microscope or the second microscope may be configured to capture three-dimensional data.

In some embodiments, the method may comprise co-registering the first overlaid image and the second overlaid image. In some embodiments, co-registering the first overlaid image and the second overlaid image may comprise dividing the first overlaid image and the second overlaid image into a plurality of sections and performing image registration for each of the plurality of sections. In some embodiments, co-registering the first overlaid image and the second overlaid image may comprise aligning at least a portion of the first overlaid image and the second overlaid image based at least in part on a coordinate transformation. In some embodiments, the coordinate transformation may be derived based at least in part on a difference in a size, a shape, a position, or an orientation of a similar feature within the first overlaid image and the second overlaid image. In some embodiments, the similar feature may comprise a cell or a neuron. In some embodiments, the cell or the neuron may have a tuning curve that is generated in response to light stimuli.

In some embodiments, the method may further comprise using the difference in the size, shape, position, or orientation of the similar feature to characterize an amount of distortion or warping of the similar feature between the first overlaid image and the second overlaid image. In some embodiments, the method may further comprise using the difference in the size, shape, position, or orientation of the similar feature to train a neural network to determine how the size, shape, position, or orientation of the similar feature is altered between different optical imaging modalities. In some embodiments, the neural network may comprise a convolutional neural network.

In another aspect, the present disclosure provides systems for multi-modal imaging. In some embodiments, the system may comprise an adapter comprising (i) a first microscope interface configured to optically couple a first microscope to an optical element in optical communication with an optical probe to provide functional imaging data of a sample, and (ii) a second microscope interface configured to optically couple a second microscope to the optical element in optical communication with the optical probe to provide structural imaging data of the sample. In some embodiments, the system may comprise a processor configured to (i) process the received functional imaging data to generate a first overlaid image, (ii) process the structural imaging data to generate a second overlaid image, and (iii) generate a third overlay of the first overlaid image and the second overlaid image.

In some embodiments, the processor may be configured to generate the first overlaid image by obtaining a first cell map, constructing a structural image from a mean projection of a motion corrected movie, and overlaying the cell map with the structural image. In some embodiments, the processor may be configured to generate the second overlaid image by obtaining structural data, using the structural data to generate a 2p/confocal structural image, obtaining functional data, using the functional data to generate a 2p/confocal functional image, and overlaying the 2p/confocal structural image and the 2p/confocal functional image. In some embodiments, the processor may be configured to co-register the first overlaid image and the second overlaid image prior to generating the third overlay. In some embodiments, the processor may be configured to set the first overlaid image to a first color channel and the second overlaid image to a second color channel different from the first color channel when generating the third overlay.

In some embodiments, the first microscope may be a one-photon microscope. In some embodiments, the second microscope may be a two-photon microscope. In some embodiments, the second microscope may be a confocal microscope. In some embodiments, the first microscope and the second microscope may be of different types. In some embodiments, the first microscope interface may be configured to permit the adapter to bear the weight of the first microscope. In some embodiments, the first microscope may weigh 20 grams or less. In some embodiments, the first microscope may have a volume of 30 cm$^3$ or less. In some embodiments, the second microscope interface may be configured to permit the second microscope to bear the weight of the adapter.

In some embodiments, the first microscope interface and the second microscope interface may be provided on a housing. In some embodiments, the first microscope interface and the second microscope interface may be provided on different sides of the housing. In some embodiments, at least a portion of the optical probe may extend out of the housing. In some embodiments, the optical element may be contained within the housing. In some embodiments, the optical probe may be attachable and separable from the adapter. In some embodiments, the optical probe may comprise a GRIN lens. In some embodiments, the first microscope and the second microscope may be configured to generate images based on light collected from the sample. In some embodiments, the adapter may be configured to cause an image generated by the first microscope and an image generated by the second microscope to align. In some embodiments, the first microscope interface and the second adapter interface may allow the adapter to be coupled and decoupled from the first microscope and the second microscope. In some embodiments, the second microscope interface may be configured to allow the adapter to be coupled to a plurality of different types of microscopes. In some embodiments, the first microscope or the second microscope may be configured to capture three-dimensional data.

In some embodiments, the processor may be configured to co-register the first overlaid image and the second overlaid image by dividing the first overlaid image and the second overlaid image into a plurality of sections and performing image registration for each of the plurality of sections. In some embodiments, the processor may be configured to co-register the first overlaid image and the second overlaid image by aligning at least a portion of the first overlaid image and the second overlaid image based at least in part on a coordinate transformation. In some embodiments, the coordinate transformation may be derived based on a difference in a size, a shape, a position, or an orientation of a similar feature within the first overlaid image and the second overlaid image. In some embodiments, the similar feature may comprise a cell or a neuron. In some embodiments, the cell or the neuron may have a tuning curve that is generated in response to light stimuli. In some embodiments, the processor may be configured to use the difference in the size, shape, position, or orientation of the similar feature to characterize an amount of distortion or warping of the similar feature between the first overlaid image and the second overlaid image. In some embodiments, the processor may be configured to use the difference in the size, shape, position, or orientation of the similar feature to train a neural network to determine how the size, shape, position, or orientation of the similar feature is altered between different optical imaging modalities. In some embodiments, the neural network may comprise a convolutional neural network.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which.

DETAILED DESCRIPTION

Figure 1:
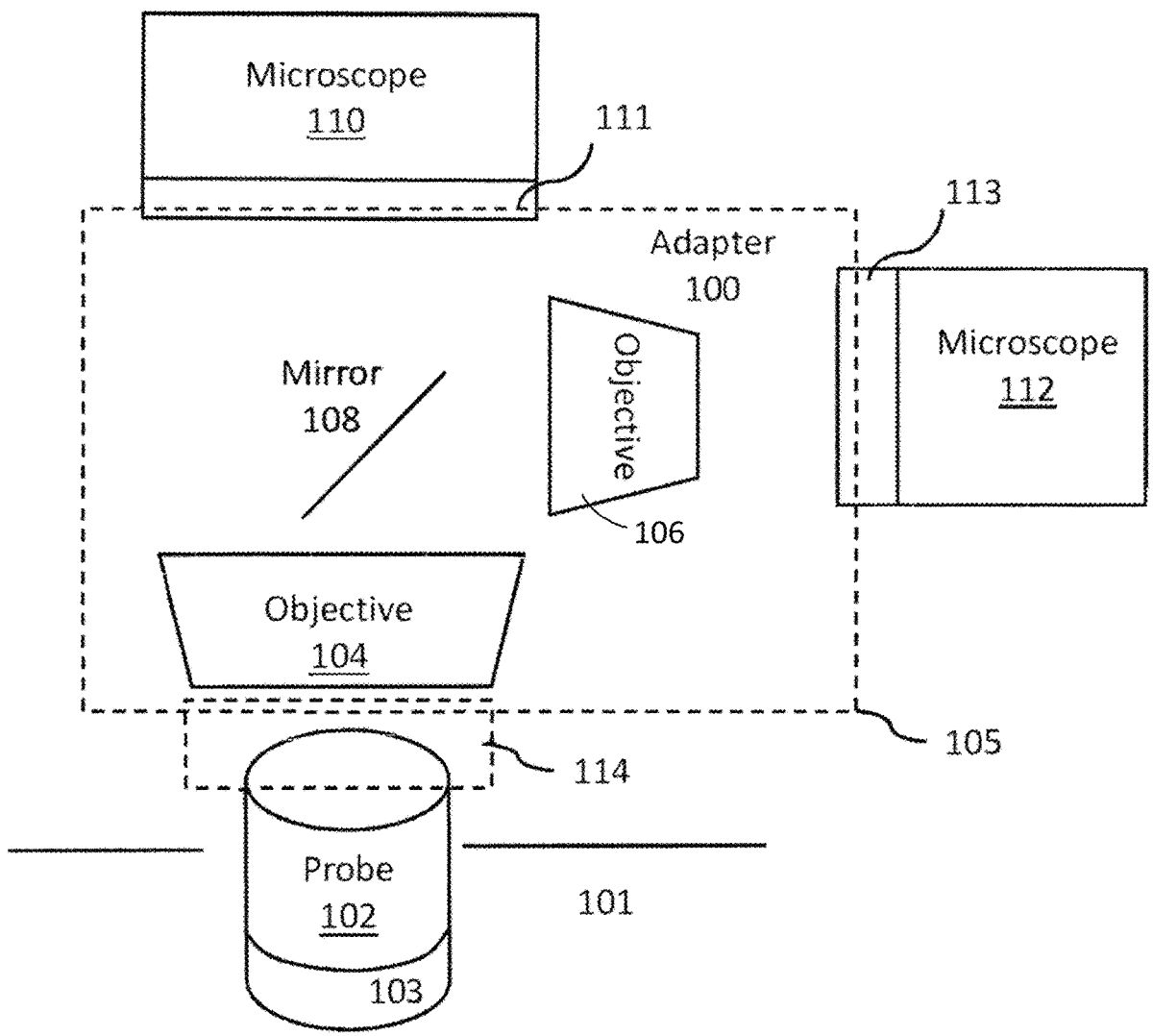
FIG. 1 shows an exemplary schematic diagram of an adapter for use in microscopic imaging, in accordance with embodiments of the invention. The adapter comprises a number of optical elements that may be configured in any of a variety of different optical arrangements.

The invention provides systems, methods, and devices which provide for optical and/or mechanical coupling of microscopes. For example, an adapter may be provided for coupling to microscopes. The microscopes may include various components such as optical components (e.g., objectives, lenses, filters, mirrors, beamsplitters, etc.), wires, physical exteriors such as a housing of the microscope, amongst other things. In some instances, the adapter may be coupled to, or used with, two or more microscopes. Accordingly, the adapter may provide a means for utilizing two or more microscopes in conjunction, simultaneously, in sequence, or selectively as desired. Each of the microscopes described herein may refer to any type of microscope system used for imaging applications. For example, the microscopes may include any type of optical microscope (e.g., bright field, polarizing, phase contrast, differential interference contrast, fluorescence, total internal reflection fluorescence, laser, multiphoton excitation, structured illumination microscopes, etc).

The microscopes referred to herein can be of any size. In some instances, the microscopes may be conventional bench top microscopes. Alternatively, the microscopes may be miniature microscopes. In some instances, the microscopes may be configured or sized to be mechanically as well as optically coupled to a live being. For example, the microscope may be configured to be grounded or, in some instances, mounted on a live being such as mice, rats, birds, and primates, etc. Optionally, the microscope may be mechanically coupled to the live being via other components such as a baseplate. If a microscope is mounted on a live being, the microscope may image the live beings (e.g., in-vivo imaging) while the live beings are freely moving or are still (e.g., while immobilized). In one example, the microscope may image a brain of the live being, while still or freely moving, and may have access to the brain, for example, via gradient-index ("GRIN") lenses. Optionally, the microscope may be coupled to a baseplate that is mounted or affixed to the live being. In some instances, the base plate and/or objective lens (e.g. a GRIN lens) may interface with both a first microscope and a second microscope, e.g. via an adapter. As one example, the adapter may enable different types of microscopes to be used together in conjunction. While the adapter being utilized with two microscopes is primarily discussed herein, it shall be understood that the adapter may enable 3, 4, 5, or more microscopes to be used together.

In some instances, the adapter may comprise one or more interfaces. Each of the interface(s) may allow the adapter to couple to a microscope. For example, the adapter may comprise a first microscope interface and a second microscope interface. Each of the interfaces may allow the adapter to be optically coupled to one or more microscopes. The adapter may in some instances further comprise an optical arrangement configured to direct light (e.g. excitation light) to a sample and/or direct light (e.g. emission light from the sample) to the first microscope and/or second microscope. In some instances, the emitted light may be directed to the first microscope and second microscope simultaneously, sequentially, or selectively as desired. The optical arrangement may include, but are not limited to, any optical elements such as lenses, filters, mirrors, etc. Advantageously, the adapter may allow different types of microscopes to image an identical imaging site. Advantageously, the adapter may enable a miniature microscope to be utilized to image a common imaging site when a live being is freely moving or still (e.g. over a period of time, over different imaging sessions). Advantageously, the adapter may enable a miniature microscope to be utilized to image a common imaging site for a freely moving being that has been, or will be imaged by a multi-photon microscope.

In some instances, the adapter may comprise one or more objective lenses. Each of the objectives may allow the adapter to be optically coupled to another optical device or assembly. For example, in some instances, the adapter may comprise a first objective and a second objective. The first objective may be optically coupled to an optical probe that is partially or fully implanted in the tissue of a subject, thereby facilitating the imaging of tissue within the subject. The second objective may be optically coupled to a microscope system for capturing images using light conveyed by the optical probe. The adapter may thus facilitate detachment and re-attachment of the microscope (optically and/or mechanically) to the implanted optical probe between imaging sessions.

In some instances, the adapter may be a very small and/or light weight device that comprises three or more optical interfaces and an optical arrangement that allows two or more microscopes to be optically and/or mechanically coupled to an optical probe that is partially or fully implanted in the tissue of a subject, thereby facilitating the imaging of tissue within the subject by the two or more microscopes using light conveyed by the optical probe. The adapter may thus facilitate detachment and re-attachment of one or more of the microscope (optically and/or mechanically) to the implanted optical probe between imaging sessions. In some instances, the adapter may be small and/or light weight enough that it is fully or partially supported by one of the two or more microscopes. In some instances, the adapter may be small and/or light weight enough that it is fully or partially supported by one of the two or more microscopes, and may function as the objective of one of the microscopes. In some instances, the adapter may be small and/or light weight enough that it is fully or partially supported by one of the two or more microscopes, and may be used to image a live subject that has been immobilized relative to the position of the one microscope. In some instances, the adapter may be small and/or light weight enough that it is supported by the optical probe, or by a baseplate attached to the subject. In some instances, the adapter may be fully or partially supported by the optical probe, or by a baseplate attached to the subject, and may itself fully or partially support one of the two or more microscopes. In some instances, the adapter may be fully or partially supported by the optical probe, or by a baseplate attached to a freely moving subject, and may itself fully or partially support one of the two or more microscopes that is used to image a freely moving subject as it goes about its normal behavior. In some instances, the adapter may be used with a single microscope to image a sample or subject even if it is configured to be optically and/or mechanically coupled to more than one microscope. In these instances, the adapter may function as an objective for the attached microscope, or may function as a means for optically and/or mechanically coupling the microscope to, e.g., an optical probe that has been fully or partially implanted in tissue of a subject.

In some instances, the adapter may comprise three or more optical interfaces and be configured to support the weight of at least one microscope. The adapter may further comprise an optical arrangement that allows two or more microscopes, including the one supported by the adapter, to be optically and/or mechanically coupled to an optical probe that is partially or fully implanted in the tissue of a subject, thereby facilitating the imaging of tissue within the subject by the two or more microscopes using light conveyed by the optical probe. The adapter may thus facilitate detachment and re-attachment of at least one of the two or more microscopes (optically and/or mechanically) to the implanted optical probe between imaging sessions.

As one example, the adapter may be provided for use with a first microscope and one or more additional microscopes. In some instances, the adapter may enable the different microscopes (e.g., one-photon or two-photon microscopes) to perform simultaneous or serial microscopic in vitro or in vivo imaging of a sample or subject (or tissue within a subject). The adapter may enable proper alignment of images captured independently by the first microscope, e.g., a miniature microscope, and the second microscope, e.g., two-photon microscope. In some instances, the adapter may enable proper alignment of images captured by the first microscope and the second microscope without the need for adjustment or displacement of either microscope system or their component optical elements (e.g., without translational or rotational movement). The adapter may enable images captured by the first microscope and the second microscope, e.g., a two-photon microscope, to be fully, substantially, or partially aligned.

The adapter may enable simultaneous images to be captured and/or viewed by the first microscope and the second microscope. Alternatively, the adapter may enable sequential images to be captured and/or viewed by the first microscope and the second microscope. In some instances, the adapter may enable selective viewing (of images captured by the first microscope and the second microscope as a user of the adapter desires). Optionally, the images captured by both microscope systems may be formed by light transmitted via a single optical probe which is in contact with, or partially implanted in, the sample or subject (or tissue within the subject). Various aspects of the invention described herein may be applied to any of the particular applications set forth below or for any other types of imaging applications. It shall be understood that different aspects of the invention can be appreciated individually, collectively, or in combination with each other.

Figure 2:
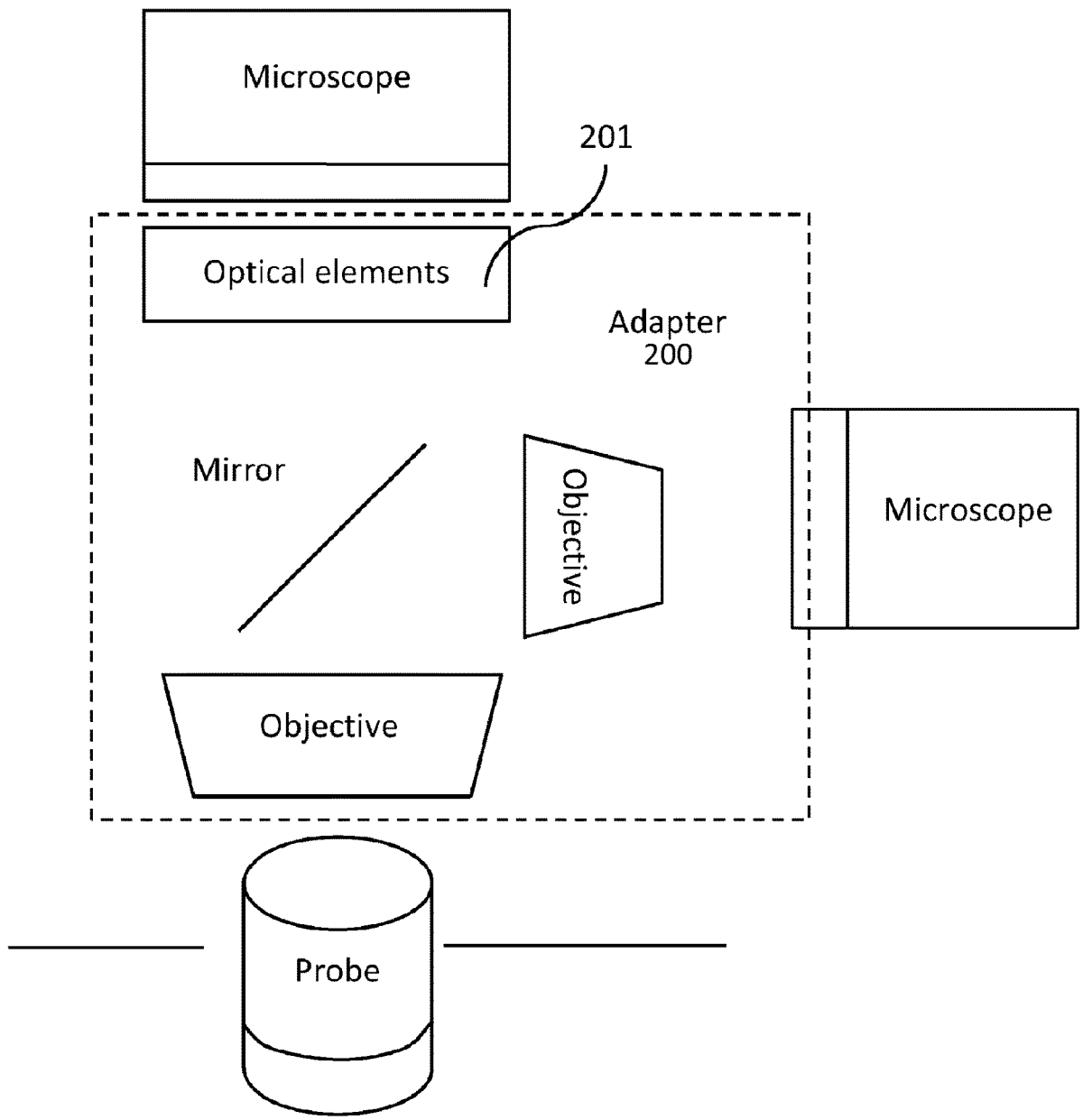
FIG. 2 shows an exemplary schematic diagram of an adapter for use in microscopic imaging, wherein the adapter comprises additional optical components in accordance with embodiments of the invention.

FIGS. 1 and 2 show exemplary schematic diagrams of an adapter, 100 or 200, in accordance with embodiments of the invention. Referring to FIG. 1, the adapter may comprise at least a first objective 104 and mirror 108 that are arranged to direct light between microscope 110 and/or microscope 112. In some instances, the adapter may be used together with an optical probe 102 which is in optical communication with the first objective lens 104 of the adapter. In some instances, optical probe 102 and objective 104 are in optical alignment, i.e., their optical axes are aligned. The probe 102 may be supported on a subject 101 which may comprise a target area to be imaged 203.

The subject may be a human subject or an animal subject. In some embodiments, animal subjects may include rodents (e.g., mice, rats, rabbits, guinea pigs, gerbils, hamsters), simians (e.g., monkeys, chimpanzees, orangutans, gorillas, and humans), equines (e.g. horses), bovines (e.g., cows), canines (e.g., domestic dogs), felines (e.g., domestic cats), avines, insects, or any other types of animals. In some instances, the subjects may weigh less than about 100 kg, 50 kg, 40 kg, 30 kg, 20 kg, 15 kg, 10 kg, 5 kg, 3 kg, 2 kg, 1 kg, 750 grams, 500 grams, 400 grams, 300 grams, 200 grams, 100 grams, 75 grams, 50 grams, 40 grams, 30 grams, 25 grams, 20 grams, 15 grams, 10 grams, 5 grams, 3 grams, or 1 gram. In some embodiments, the probe can be mounted on and/or inserted into a living organism or a non-living organism. The target area may include neural tissue of the subject, but may alternatively or in addition include any target area of the subject, e.g. muscle tissue, skin tissue, etc.

The first objective lens 104 may be configured to be in optical communication with mirror 108. The mirror 108 may be in optical communication with a second objective lens 106, with microscope 112 (e.g., a miniature microscope), and/or with microscope 110 (e.g., a two-photon microscope). An objective lens as used throughout may refer to a lens at or near a surface of a device such as the adapter. The second objective lens 106 may, in some instances, belong to microscope 112, or in some instances may be a component of adapter 100 that is in optical communication with microscope 112. In some instances, the optical axes of objective 104 and objective 106 are different. In some instances, the optical axis of objective 104 and optical axis of objective 106 may be substantially perpendicular to each other, as indicated in FIG. 1. The adapter may further comprise various additional optical elements (e.g., optical elements 201 as illustrated schematically in FIG. 2). The optical elements (or optical components) may include, but are not limited to, lenses or lens systems, optical filters, prisms, beamsplitters, dichroic reflectors, mirrors, optical fibers, diffractive optical elements for correction of chromatic aberration, etc., and may be configured in any of a number of optical arrangements known to those of skill in the art.

The adapter may optionally further comprise one or more interfaces 111, 113, 114 that allow one or more microscopes 110, 112, one or more objectives 106, and/or one or more optical probes 102 to be brought into optical communication with the adapter in a repeatable manner. For instance, the microscope interfaces and/or objective interfaces may allow the microscopes and/or objectives to be repeatedly coupled to the adapter and aligned relative to optical probe 102 in the same manner over multiple uses (i.e., over repeated cycles of attachment and removal). The repeatability of the alignment may allow the adapter and/or microscopes to be easily swapped in and out. The microscopes and/or objectives may easily be aligned to permit high quality, simultaneous or serial imaging by two or more microscopes. In some instances, microscope interfaces 111 and 113 may be configured to be directly connected to an objective lens of a microscope. In some instances, the one or more microscopes coupled to the adapter by means of interfaces 111, 113, etc., may be the same type of microscope. In some instances, the one or more microscopes coupled to the adapter by means of interfaces 111, 113, etc., may be two or more different types of microscope, e.g., microscopes that have different imaging properties such as different fields-of-view, different image resolutions, different depths-of-field, or operating in different wavelength ranges.

An optical probe 102 may be configured to be in optical communication with a target to be imaged (e.g., a structure or tissue within a sample or subject) in such a way that light is transmitted to the target and/or collected from the target via the probe. The optical probe may be an endoscopic probe that may be partially or fully inserted into a subject (or tissue within a subject), or may image an exterior portion of a sample or subject. In some instances, the subject may be a live being, such as a mouse, rat, bird, primate, human, insect, fish, etc. The probe may be coupled to the live beings (e.g., for in vivo imaging) while the live beings are freely moving, freely behaving, or are still. In some instances, the subject may be immobilized or a portion of the subject (e.g., the head) may be immobilized during imaging. The live being may be conscious or may be unconscious. In some embodiments, the live being may or may not be anesthetized. For example, the optical probe may provide optical access to a brain of the live being. The target to be imaged may be a tissue of the live being, such as brain tissue of the live being.

In some instances, the optical probe 102 may be or may include a gradient index (GRIN) lens and/or other relay lens. The GRIN lens can be a lens in which the refractive index of the lens varies along a dimension perpendicular to the optical axis. The gradient index lens may have a pitch of at least about $1/2$, $2/2$, $3/2$, $4/2$, $5/2$, $6/2$, $7/2$, $8/2$, $9/2$, $10/2$, $11/2$, $12/2$, or $13/2$. The gradient index lens may have diameters ranging from 0.001 mm to 5 mm. The gradient index lens may have a numerical aperture (NA) of at least about 0.001, 0.01, 0.1, 0.2, 0.3, 0.4, 0.5, 0.6, 0.7, 0.8, or 0.85. The GRIN lens may comprise one or more flat surfaces. The GRIN lens may have an angled surface. The angle may be a 45 degree angle. In some instances, optical probe may comprise two or more GRIN lenses. In some instances, optical probe 102 may further comprise a right angle prism and corrective optical element in addition to the GRIN lens to correct for aberration due to field curvature when viewing through a cylindrical side of the probe. In some instances, a corrective optical element may be included in the adapter when the probe comprises a right angle prism in addition to the GRIN lens. In some instances, the GRIN probe may comprise a combination of optical corrective elements and GRIN elements, e.g., in color corrected probes, where the corrective elements are sandwiched between multiple GRIN lenses and form a stack of optical elements. In some instances, the optical probe 102 may optionally comprise or be used in conjunction with a cannula (e.g., a metal or glass cannula) at least partially implanted within the subject and within which the GRIN lens is fitted. In these embodiments, the adapter housing may comprise a mechanical coupler to attach the cannula to the adapter. In these embodiments, the mechanical coupler may also align the optical axis of the microscope and that of the GRIN lens probe. In some instances, the optical probe, e.g., a GRIN optical probe, may be a cylindrical probe with a small diameter. The probe (with or without a cannula) may have a diameter of less than or equal to about 10 mm, 5 mm, 4 mm, 3 mm, 2 mm, 1 mm, 0.5 mm, 0.1 mm, 0.05 mm, 0.01 mm, 0.005 mm, or 0.001 mm. The small diameter of the probe may reduce the amount of damage induced upon insertion into the subject. The optical probe may have a length of less than or equal to about 10 mm, 9 mm, 8 mm, 7 mm, 6 mm, 5 mm, 4 mm, 3 mm, 2 mm, or 1 mm.

In some instance, the probe 102 may optionally be supported on the subject with the aid of a mounting structure, such as a base plate. The mounting structure may keep the optical probe relatively stationary relative to the subject. The mounting structure may be provided on an exterior of the subject, such as the head of the subject. The mounting structure and/or the probe may be adhered to the subject (e.g., using adhesives or surgical fasteners). The mounting structure may have a size or shape adapted to fit a living being, for example, so that it may be carried on the head of a mouse or other rodent.

The adapter 100 may be optically coupled to the optical probe 102. The coupling may or may not involve physical coupling. An optical axis of objective lens 104 may line up with an optical axis of probe 102. In some instances, the adapter may not be physically coupled to the probe. For example, the adapter may act as an objective lens of microscope 110 or 112. The probe 102 may move along with the subject 101 (or a stage on which the subject is held). In some instances, the adapter may be located a distance equal to or less than about 30 cm, 25 cm, 20 cm, 15 cm, 10 cm, 5 cm, 1 cm, 0.5 cm, 0.1 cm, 750 um, 500 um, 250 um, 100 um or 50 um to image the target region. In some instances, an objective of the adapter (e.g. objective 104) may be located a distance equal to or less than about 30 cm, 25 cm, 20 cm, 15 cm, 10 cm, 5 cm, 1 cm, 0.5 cm, 0.1 cm, 750 um, 500 um, 250 um, 100 um or 50 um to image the target region.

In some instances, the adapter 100 may be mechanically and/or optically coupled to optical probe 102 by means of probe interface 114 such that the components therein, e.g., objective lens 104, are in optical communication with probe 102. An optical axis of objective lens 104 may line up with an optical axis of probe 102. In some instances, the adapter may have a fixed position relative to the probe. In some instances, the mechanical coupling of probe interface 114 may be undone such that adapter 100 is separable and removable from probe 102 after first having been attached. In some instances, the mechanical coupling of probe interface 114 may be permanent such that adapter 100 is not removable from probe 102. Examples of suitable configurations for probe interface 114 include, but are not limited to, mated features on adapter 100 and probe 102 that form a tight press fit, mated threaded features, mated quick-release fittings, mated features that are held in place using set screws, mated features on adapter 100 and probe 102 that are permanently bonded using an adhesive, etc. In some instances, the adapter may be mounted onto the subject. The adapter may or may not be mounted on the probe and/or a mounting structure for the probe. The adapter may be mounted in a manner that allows for repeated alignment between the probe and the first objective when the adapter is removed and/or re-attached.

The optical probe 102 may be in optical communication with an objective lens 104. The objective lens may have any desired optical property. The optical axis of the probe may be aligned with an optical axis of the objective lens. Light reflected, scattered, or emitted from a target area to be imaged may pass through the probe to the objective lens. In some instances, the light may pass through objective lens 104 to a mirror 108. A first objective lens 104 may optionally be configured to provide an infinite focal length (e.g., may have infinity correction). This may be beneficial for use of the adapter with the microscopes, e.g., a two-photon microscope 110. This may allow for a two-photon microscope to be easily coupled to the subject and capture images of the target area via optical probe 102.

In some instances, objective lens 104 (and/or objective 106) may be a single lens. In some instances, objective lens 104 (and/or objective 106) may be compound lenses. In some instances, objective lens 104 (and/or objective 106) may be GRIN lenses. In some instances, objective lens 104 (and/or objective 106) may have a diameter of less than or equal to about 50 mm, 40 mm, 30 mm, 20 mm, 10 mm, 5 mm, 4 mm, 3 mm, 2 mm, 1 mm, 0.5 mm, 0.1 mm, 0.05 mm, 0.01 mm, 0.005 mm, or 0.001 mm. In some instances, objective lens 104 (and/or objective 106) may have a focal length of about 200 mm, about 100 mm, about 50 mm, about 25 mm, about 10 mm, about 5 mm, or about 1 mm. In some instances, objective lens 104 (and/or objective 106) may have a numerical aperture of about 0.95, about 0.85, about 0.75, about 0.65, about 0.55, about 0.45, about 0.40, about 0.25, about 0.1, or about 0.01. In some instances, the NA of the objectives matches the NA of the GRIN probe, e.g., with NA values ranging from about 0.45 to 0.5, which may facilitate optimal light collection. In some instances, objective lens 104 (and/or objective 106) may have a working distance of about 15 µm, 25 µm, 50 µm, 100 µm, 0.2 mm, 0.4 mm, 0.8 mm, 1 mm, 2 mm, 4 mm, 6 mm, 8 mm, 10 mm, 12 mm, 14 mm, 16 mm, 18 mm, or 20 mm. In some instances, objective lens 104 (and/or objective 106) may be corrected for chromatic and/or spherical aberration.

The first objective lens 104 and a second objective lens 106 may optionally be the same type of objective and/or may have one or more of the same mechanical and/or optical properties. The first and second objectives may be the same type of lens or different types of lenses. The first objective and second objective may permit the transmission of near-UV light, visible light, and/or near infrared light. The first objective and/or second objective may focus, collimate, and/or disperse light in a desired fashion. In some embodiments, the first objective and/or second objective may be compatible with infrared and/or fluorescence imaging.

The adapter 100 may also include a mirror 108. In some embodiments, a mirror may be configured to be fully reflective. Light that reaches the mirror may be reflected to another location. For example, light from a first objective 104 may be reflected or directed to a second objective 106. In another example, light from the first objective may be reflected to microscope 110, e.g., a two-photon microscope. When the mirror is fully reflective (e.g., 100% reflective), or mostly reflective (e.g., 50% or more, 75% or more, 90% or more, 95% or more, or 99% or more reflective), the mirror may be movable to direct the reflected light to a desired location. In some instances, mirror 108 may provide a 50/50 split of light directed to microscope 110 and microscope 112. The mirror may move with aid of an actuator (e.g., a motor). Alternatively, the mirror may move with aid of manual manipulation. The mirror may rotate about an axis to direct the light to the second objective or to microscope 110, e.g., the two-photon microscope, selectively. In some instances, the mirror may flip around to change orientations. In some instances, the mirror may slide in-and-out of the optical path to direct light to a different objective or microscope. Thus, the second objective and microscope 110 may receive light from optical probe 102 in an alternative or sequential fashion.

In another example, the mirror 108 may not be fully reflective. The mirror may allow light from the first objective 104 to be split and sent to both the second objective 106 (which may be in optical communication with microscope 112) and microscope 110 simultaneously. The mirror may be a beamsplitter. The mirror may be a dichroic reflector. The mirror may have a coating that may enable the light to be split. Thus, the second objective 106 and microscope 110 may receive light from the probe in a parallel, or simultaneous, fashion.

The mirror may be configured to optically direct light (e.g., excitation light) from a plurality of different types of microscopes such as epifluorescence and multiphoton microscopes, and to direct light (e.g. emitted light from the target area) to a plurality of different types of microscopes. The mirror may be configured to optically direct light (e.g. excitation light) from a plurality of different types of microscopes such as epifluorescence and multiphoton microscopes, and to direct light (e.g. emitted light from the target area) to a plurality of different types of microscopes within a single imaging session. A single imaging session may comprise the collection of one or more images over a continuous period of time. The imaging session may have a duration of less than 1 minute, less than 5 minutes, less than 10 minutes, less than 30 minutes, less than 1 hour, less than 2 hours, less than 5 hours, less than 10 hours, less than 1 day, less than 2 days, less than 5 days, less than 10 days, or less than 30 days. The imaging session may have a duration in a range defined by any two of the preceding values. An imaging session may be defined by a length of time during which a microscope is collecting data. An imaging session may begin when a microscope starts generating images and may end when the microscope stops generating images. An imaging session may begin when microscopes coupled to the adapter starts generating images and may end when the microscopes stop generating images. An imaging session may begin when the microscopes are turned on and may end when the microscopes are turned off. A probe position may or may not be altered during an imaging session. The imaging session may be defined by a length of time while a probe is inserted into the object. The imaging session may start when insertion of the probe into the object begins, and may end when the probe is removed from the object. The position of the probe may be altered during the imaging session. A single imaging session or multiple imaging sessions may occur during a longitudinal study.

In some instances, mirror 108 may be a dichroic reflector configured to discriminate between light within a wavelength range of about 400 nm to 500 nm and light within a wavelength range of about 500 nm and 800 nm. In some instances, mirror 108 may be a dichroic reflector configured to discriminate between light within a wavelength range of about 500 nm to 650 nm and light within a wavelength range of about 350 nm and 560 nm. In some instances, mirror 108 may be a dichroic reflector configured to pass infrared (IR) light from a two-photon microscope and reflect all of the excitation light provided by a miniature one-photon fluorescence microscope.

The adapter may include a housing 105, as indicated by the dashed lines in FIGS. 1 and 2. The housing may partially or completely enclose one or more components of the adapter within the housing, e.g., the housing may enclose the mirror. In some instances, the housing may be light-tight or substantially light-tight. The first objective may be provided within the housing, may be integrated directly with the housing, or may be mounted on the housing. In some instances, the housing may have a volume of less than about 2,000 cubic centimeters, 1,500 cubic centimeters, 1,000 cubic centimeters, 500 cubic centimeters, 250 cubic centimeters, 100 cubic centimeters, 50 cubic centimeters, 25 cubic centimeters, 20 cubic centimeters, 15 cubic centimeters, 12 cubic centimeters, 10 cubic centimeters, 8 cubic centimeters, 7 cubic centimeters, 6 cubic centimeters, 5 cubic centimeters, 4 cubic centimeters, 3 cubic centimeters, 2 cubic centimeters, 1 cubic centimeter, 0.5 cubic centimeters, or 0.1 cubic centimeters. In some instances, the adapter housing may have a long dimension that is less than about 50 cm, 40 cm, 30 cm, 20 cm, 10 cm, 5 cm, 4.5 cm, 4 cm, 3.5 cm, 3 cm, 2.5 cm, 2 cm, 1.5 cm, 1 cm, or 0.5 cm. In some instances, the collective weight of the adapter housing and the optical elements of the optical arrangement contained therein may be equal or less than about 1 kg, 0.9 kg, 0.8 kg, 0.7 kg, 0.6 kg, 0.5 kg, 0.4 kg, 0.3 kg, 0.2 kg, 0.1 kg, 90 grams, 80 grams, 70 grams, 60 grams, 50 grams, 40 grams, 30 grams, 20 grams, 10 grams, 9 grams, 8 grams, 7 grams, 6 grams, 5 grams, 4 grams, 3 grams, 2 grams, or 1 gram. In some instances, the ratio of the longest adapter housing dimension to that of one of the microscopes attached to the adapter may be at most 1:1, 1:10, 1:100, or 1:1000.

In some instances, interfaces 111, 113, and 114 may be provided within the housing, may be integrated directly with the housing, or may be mounted on the housing. In some instances, at least a first microscope interface is configured to permit at least a first microscope to contact the housing of the adapter. In some instances, at least a first microscope interface is configured to permit the adapter to bear the weight of at least a first microscope. In some instances, a first and a second microscope interface may be provided on the same side of the housing. In some instances, a first and a second microscope interface may be provided on different sides of the housing. In some instances, a first and a second microscope interface may be provided such that the adapter is configured to orient a first and a second microscope at 90 degrees relative to each other. In some instances, the adapter may be configured such that the first and second microscopes are positioned at about 180 degrees, 170 degrees, 160 degrees, 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees, 20 degrees, or 10 degrees relative to each other. In some instances, the adapter may be configured such that the position of the first and second microscopes relative to each other is adjustable. Examples of suitable configurations for microscope and/or objective interfaces 111 and 113 include, but are not limited to, mated features on adapter 100 and microscopes 110 or 112 that form a tight press fit, mated threaded fittings, mated quick-release fittings, etc. In some instances, at least a portion of optical probe 102 extends out of the housing. In some instances, mirror 108 is at least partially enclosed within the housing.

In some instances, the adapter may include the second objective 106. Alternatively, the second objective may be separate from the adapter, e.g., may be part of microscope 112, but may be in optical communication with the adapter. The second objective may be within or formed on a housing 105.

The adapter may be configured to be attached to, or optically coupled with, various commercially-available microscopes. For example, the adapter may be configured to be coupled to miniature, one-photon epifluorescence microscopes or to two-photon microscopes. Optionally, the adapter may be configured to be partially or fully coupled with an objective of a microscope, e.g., a two-photon microscope. Optionally, the adapter may be configured to function as an objective of a microscope, e.g., two-photon microscope. It is to be understood that the adapters of FIGS. 1 and 2 may further comprise various optical elements that are not shown, or may comprise the optical probe 102 and/or the microscope 112. In some instances, the adapter may comprise a focusing mechanism. In some instances, the adapter may not comprise a focusing mechanism. Additionally, while the adapters of FIGS. 1 and 2 are illustrated to include certain elements (e.g., objective 106), it is to be understood that the adapter may exclude some of the optical elements shown. For example, the adapter may not comprise objective 106, and objective 106 may be a part of microscope 112.

The adapter may be in optical communication with a microscope 112. In some instances, the adapter may be mechanically and/or optically coupled to microscope 112 via microscope interface 113. In some instances, the adapter may attach to the microscope in a manner that an objective would be attached. Alternatively, the microscope may be mounted onto a housing of the adapter and may form a part of the adapter. The microscope may or may not be separable from the housing of the adapter. The second objective 106, if present, may be a part of, or in optical communication with microscope 112. Alternatively, the adapter need not contact microscope 112. The mirror within the adapter may permit optical communication between the first objective 104 and the microscope. The second objective 106 may function as an objective of microscope 112. The second objective may be a part of the microscope and may or may not be separable from the adapter. Alternatively, the second objective may be separate from the microscope. The adapter may function as an objective lens system for the microscope 112. Adapters with different mechanical and/or optical properties (e.g., having different objective lens focal lengths, numerical apertures, and/or mirror reflectance properties) may be attached and detached to microscope 112 (or to microscope 110). Different adapters may be swapped for one another.

The microscope 112 may be any type of microscope. In some instances, the microscope 112 may be a one-photon, epifluorescence microscope. The microscope may be a miniature microscope or a benchtop microscope. In some examples, the microscope may be of any size suitable for coupling to a live being. In some instances, the microscope may be of a size and/or weight that can be mounted on and carried by the live being. For example, the microscope may be attached to the living being through appropriate means (e.g., using a baseplate, and/or adapter) and may be carried while the live being goes about its activities. In some instances, the microscope may be equal or less than about 30 grams, 25 grams, 20 grams, 15 grams, 10 grams, 9 grams, 8 grams, 7 grams, 6 grams, 5 grams, 4 grams, 3 grams, 2 grams, or 1 gram in weight. In some instances, the collective weight of the adapter housing, the optical elements of the optical arrangement contained therein, and the microscope may be equal or less than about 1 kg, 0.9 kg, 0.8 kg, 0.7 kg, 0.6 kg, 0.5 kg, 0.4 kg, 0.3 kg, 0.2 kg, 0.1 kg, 100 grams, 90 grams, 80 grams, 70 grams, 60 grams, 50 grams, 40 grams, 30 grams, 20 grams, 10 grams, 9 grams, 8 grams, 7 grams, 6 grams, 5 grams, 4 grams, 3 grams, 2 grams, or 1 gram. In some instances, the microscope may comprise a maximum dimension equal to or less than about 5 inches, 4 inches, 3 inches, 2 inches, or 1 inch. Optionally, the microscope may comprise a volume equal or less than about 100 cubic inches, 75 cubic inches, 50 cubic inches, 30 cubic inches, 20 cubic inches, 10 cubic inches, 5 cubic inches, 3 cubic inches, 2 cubic inches, 1 cubic inch, 0.75 cubic inches, or 0.5 cubic inches. In some instances, the microscope may comprise a volume equal or less than about 2,000 $cm^3$, 1,500 $cm^3$, 1,000 $cm^3$, 500 $cm^3$, 100 $cm^3$, 50 $cm^3$, 40 $cm^3$, 30 $cm^3$, 20 $cm^3$, 10 $cm^3$, 1,000 $mm^3$, 800 $mm^3$, 600 $mm^3$, 400 $mm^3$, 200 $mm^3$, 100 $mm^3$, or 50 $mm^3$. The microscope may comprise various optical elements, e.g. lenses, electronic lenses (e.g., e-lenses, deformable lenses, or tunable lenses), bandpass filters, long-pass filters, short-pass filters, dichroic reflectors, mirrors, beamsplitters, prisms, etc. The microscope may comprise one or more image sensor arrays such as CCD or CMOS image sensors. Optionally, the microscope may comprise one or more light sources, e.g. LEDs, SLEDs, diode lasers, or fiber-coupled lasers.

Microscope 112 may be capable of performing high resolution imaging, e.g., bright-field, dark-field, or fluorescence imaging, across a specified field of view. For example, the microscope may be capable of performing cellular or subcellular resolution imaging. In some instances, microscope 112 (and/or microscope 110) may be capable of imaging with a resolution of at least 0.1 um, 0.5 um, 1 um, 1.5 um, 2 um, 2.5 um, 3 um, 4 um, 5 um, 10 um, 20 um, 50 um, or 100 um at the center of the field of view. In some instances, microscope 112 (and/or microscope 110) may be capable of imaging with a resolution of at least 0.1 um, 0.5 um, 1 um, 1.5 um, 2 um, 2.5 um, 3 um, 4 um, 5 um, 10 um, 20 um, 50 um, or 100 um across the field of view. In some instances, the field of view for microscope 112 (and/or microscope 110) may be at least about 0.01 $mm^2$, 0.05 $mm^2$, 0.1 $mm^2$, 0.2 $mm^2$, 0.3 $mm^2$, 0.4 $mm^2$, 0.5 $mm^2$, 1 $mm^2$, 5 $mm^2$, 10 $mm^2$, 20 $mm^2$, 30 $mm^2$, 40 $mm^2$, 50 $mm^2$, 60 $mm^2$, 70 $mm^2$, 80 $mm^2$, 90 $mm^2$, or 100 $mm^2$. As previously described, a sensor array may be used to image the target region of the sample or subject. In some instances, microscope 112 may be configured to perform multicolor fluorescence imaging. Such microscopes may comprise: (i) one or more light sources that provide excitation light at one or more wavelengths (or wavelength ranges), (ii) a first optical arrangement configured to deliver excitation light at the one or more excitation wavelengths (or wavelength ranges) to the sample or subject, (iii) a second optical arrangement configured to collect emitted fluorescent light at one or more wavelengths (or wavelength ranges) from the sample or subject and form one or more images therefrom, and (iv) one or more image sensors to capture the one or more images. The first and second optical arrangements may comprise a variety of optical components, including but not limited to, objective lenses, lenses, filters, mirrors, prisms, beamsplitters, dichroic reflectors, and the like.

Figure 3:
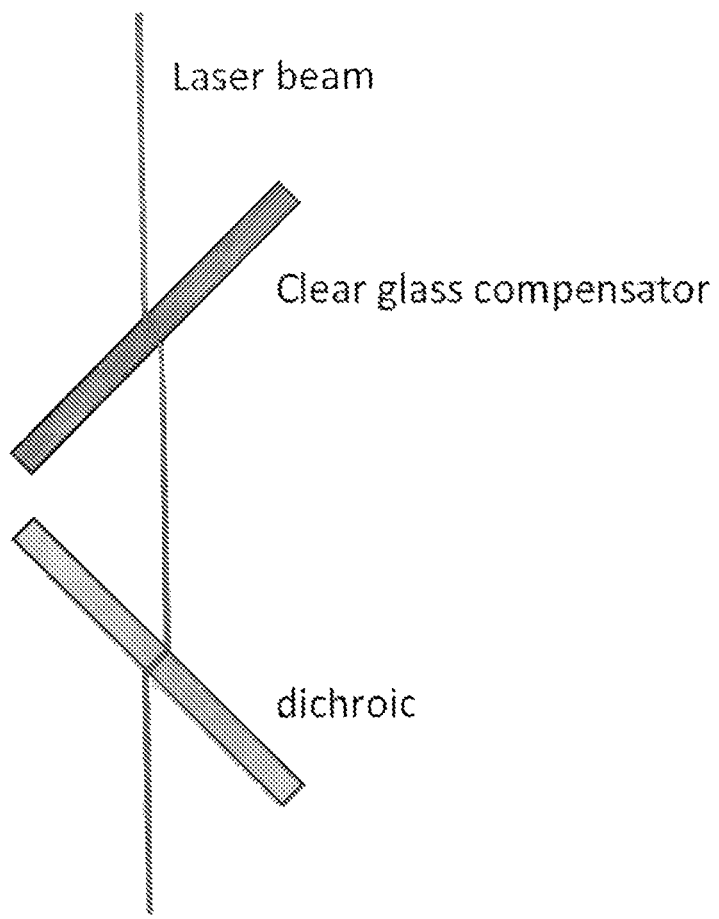
FIG. 3 provides a schematic illustration of the use of a compensator to correct for the beam displacement caused by passing a laser beam through a dichroic reflector, thereby improving the positioning accuracy of the laser beam when it impinges on a target region, e.g., a single cell, within the field-of-view of an imaging system of the present disclosure.

In some instances, microscope 112 may be a microscope designed for use in performing optogenetic studies. Such microscope systems may comprise: (i) an imaging light directing arrangement of optical elements that directs imaging light from an imaging light source to a sample in a field-of-view of the microscope system, (ii) a stimulation light directing arrangement of optical elements that directs stimulation light from a stimulation light source to at least a portion of the sample for optogenetic stimulation of that portion of the sample while the sample is illuminated by the imaging light, (iii) an optical path that directs the imaging light and the stimulation light to the sample, wherein the imaging light and the stimulation light are transmitted through one or more shared optical elements in the optical path, and wherein the area of the sample receiving the stimulation light overlaps with that receiving the imaging light, and (iv) an image sensor that receives light emitted from the sample to generate an image of the sample while the stimulation light is directed to a portion of the sample. In some instances, such microscope systems designed for use in performing optogenetic studies may further comprise a compensator such as that illustrated in FIG. 3 to improve the positional accuracy of the stimulation light (e.g., a stimulation laser beam or collimated stimulation light produced by the stimulating light directing arrangement) as it impinges on a target region, e.g., a single cell or a selected group of cells, within the field-of-view of the microscope system. As indicated in FIG. 3, when, e.g., a laser beam passes through a dichroic reflector of the adapter, the beam may be displaced. This may result in a shift in the position of the beam relative to the sample within the field-of-view of the microscope system, and thus a loss of positional accuracy may occur when stimulating, e.g., single cells. To correct for this beam shift, a compensator may be used. In some instances, the compensator may comprise a clear glass plate (e.g., a clear glass compensator). In some instances, the compensator may be oriented at an angle of 45° relative to the axis of the stimulating laser beam (i.e., perpendicular to the dichroic reflector when both are oriented at an absolute angle of 45° relative to the optical axis). In some instances, the angle may be equal to about 15°, 30°, 45°, 60°, 75°, or any value there between, and the dichroic reflector may be oriented at an angle having the corresponding negative value. The compensator may be optically transparent at the wavelengths used for stimulation. In some instances, the compensator may have the same thickness as the dichroic reflector so as to accurately compensate for the beam shift. Alternatively or in addition, the compensator may be constructed of the same material (e.g., an optical glass) or a material having the same index of refraction as the dichroic reflector so as to accurately compensate for the beam shift. In some instances, the compensator may have a different thickness and/or may be constructed of a different material than the dichroic reflector, and the compensator and dichroic reflector may be oriented at different absolute angles relative to the optical axis. In some instances, the compensator may be a fixed component of the adapter. In some instances, the adapter may comprise more than one compensator, e.g., the adapter may comprise two or more compensators to correct for beam shift of two or more laser beams or collimated stimulation light beams.

Another approach to the issue of correcting for beam shift may be to use a multi-position mirror holder (or multi-position filter holder) with the dichroic reflector and the compensator installed in two separate positions, e.g., a first position and a second position respectively. To calibrate the beam position using the adapter, one can position the compensator in the light path (e.g., position 2 on the multi-position mirror holder) and follow the beam calibration procedure on the multiphoton system. Then, one can switch to the dichroic mirror position (e.g., position 1 on the multi-position mirror holder) and follow up with photo-stimulation and imaging experiments using the adapter. The multi-position mirror holder may have any of a variety of configurations known to those of skill in the art, e.g., a rotary mirror (or filter) wheel, a linear slider, etc.

The adapter may be in optical communication with a microscope 110. In some instances, the adapter may be mechanically and/or optically coupled to microscope 110 via microscope interface 111. In some instances, the adapter may attach to microscope 110 in a manner that an objective would be attached. In some instances, the adapter may be optically coupled to microscope 110 via an optical fiber or liquid light guide. Alternatively, the adapter need not contact microscope 110. The mirror within the adapter may permit optical communication between the first objective 104 and the microscope. The adapter may function as an objective lens system for the microscope 110. Adapters with different mechanical and/or optical properties (e.g., having different objective lens focal lengths, numerical apertures, and/or mirror reflectance properties) may be attached and detached to microscope 110. Different adapters may be swapped for one another.

The microscope 110 may be any type of microscope, e.g., a wide-field epifluorescence microscope, multiphoton microscope, confocal laser scanning microscope, coherent Raman scattering microscope, etc. In some instances, the microscope 110 may be a two-photon microscope. Microscope 110 may be a benchtop or miniature microscope. Examples of suitable, commercially-available microscopes for use as microscope 110 include, but are not limited to, the Neurolabware (Los Angeles, Calif.) Resonant Scanning Two-Photon Microscope, the Intelligent Imaging Inovations (Denver, Colo.) Vivo 2-Photon System, and systems available from Bruker (Billerica, Mass.), Olympus (Waltham, Mass.), Thorlabs (Sterling, Va.), Scientifica (East Sussex, UK), Zeiss (Thornwood, N.Y.), or Leica Microsystems (Buffalo Grove, Ill.), etc. The adapter may also be used with custom-built two-photon microscopes, confocal laser scanning microscopes, etc.

In some embodiments, imaging of the target region 103 may be performed using light that is reflected, scattered, transmitted, or emitted by the sample or tissue within target region 103. In some instances, the light may emanate from the target region itself. Alternatively or in addition, light may be transmitted to the target region through the probe 102. The light provided through the optical probe may be at a near UV wavelength, visible wavelength, infrared wavelength, or any wavelength that may stimulate fluorescence at the target region. The light may be provided from an ambient environment, or a light source on-board, e.g., a two-photon microscope 110, another microscope 112 such as a one-photon microscope, and/or the adapter 100 itself. The light source may optionally be an LED light source. The light source may optionally be a laser. In some instances, the light may optionally be coupled with the adapter or microscopes by means of an optical fiber. Light delivered to the target region by the probe may be reflected or scattered from the target region and transmitted back through a GRIN lens of probe 102. Alternatively, the light collected from the target region and transmitted back through a GRIN lens of probe 102 may be light, e.g. one-photon fluorescence, two-photon fluorescence, or second harmonic light, that has been excited within the target region by the light transmitted to the target region by probe 102.

In one example, a microscope 112 may be directly coupled to an optical probe 102. The microscope may be mounted to the probe and/or a mounting structure, e.g., a baseplate. The microscope 112 may be a miniature microscope that is capable of being carried by the subject while the subject is freely moving. The microscope may be used to image the target region without use of the adapter. The microscope may then be removed from the probe, and the adapter may be attached to the probe. The microscope 112 may be attached to the adapter. In some instances, the adapter may be configured to fully or partially support microscope 112. Attachment of microscope 112 to the adapter may permit the microscope 112 to still be used for imaging the target region of a subject (while immobilized or freely moving), while also allowing another microscope 110 to image the target region (typically, after immobilizing the subject relative to the position of microscope 110). Such images may be viewed in parallel at the same time, or may be viewed sequentially. In some instances, an adapter may be used initially for imaging. The adapter may then be removed and then the microscope 112 may be directly attached to the probe. Different adapters may be swapped out. The different adapters may have different mechanical and/or optical properties, such as different objective lens focal lengths, numerical apertures, and/or mirror reflectance properties. The adapter may be an attachment that provides additional flexibility to the imaging system. In some instances, the adapter may be small and/or light weight enough that it is fully or partially supported by microscope 110. In some instances, the adapter may function as the objective for microscope 110, and may be used to image a live subject that has been immobilized relative to the position of microscope 110. In some instances, the adapter(s) may couple one microscope 110 to one or more microscopes 112 with different optical imaging properties. In some instances, the adapter(s) may couple one microscope 110 to two or more microscopes 112 with different optical imaging properties. For example, the adapter and/or mirror within the adapter may be used to direct light to multiple microscopes (e.g., miniature microscopes) with different optical filter sets. Optionally, the adapter(s) may couple one microscope 110 to three, four, five, six, seven, eight, nine, ten or more microscopes 112 with different optical imaging properties. The different optical imaging properties for the different microscopes may comprise, e.g., different imaging fields-of-view, different imaging resolutions, different fluorescence excitation wavelengths or wavelength ranges, different fluorescence emission wavelengths or wavelength ranges, etc.

As noted above, in some instances, the adapter may comprise a focusing mechanism used to align the focal plane of microscope 110 and the one or more microscopes 112. In order to align the focal plane of the two (or more) microscopes, a test target is imaged using, for example, a two photon microscope (110) and then the focusing mechanism of the adapter is adjusted such that microscope 112 will focus on the same target. In other instances, the focusing mechanism of microscope 112 is used to focus on the test target. The disadvantage of the latter procedure is that the optical settings (e.g., magnification, FOV) of microscope 112 may change during focusing. This may make it harder to compare images, e.g., images of a freely behaving subject with two photon images collected for the same subject.

As described above, the microscope 112 may be sized and/or shaped to be carried by the subject. For instance, the microscope may be a miniature microscope that may be carried by a rodent, such as a mouse, while the rodent may move about. A miniature microscope may also be referred to as a miniscope. For instance, the rodent may walk freely about while supporting a miniature microscope. The adapter may or may not be sized and/or shaped to be carried by the subject. For instance, the adapter may be a miniature component that may be carried by a rodent, such as a mouse, while the rodent moves about. The adapter may have any dimensions described for the microscope. The adapter may be larger than, smaller than, or have substantially equal size to the microscope. Alternatively, the adapter need not be so portable. The adapter may optionally be used when the sample or subject, or a target region of the sample or subject, is substantially immobilized. The adapter may be used when a sample or subject, or target region of the sample or subject is affixed. For instance, a rodent's head may be affixed.

In some instances, the adapter may be used connect two or more microscopes of the same or different type to a single optical probe, thereby enabling multimode imaging of a sample or subject. For example, microscope 112 may be a miniature epifluorescence microscope and microscope 110 may be a conventional bright field microscope, thus permitting simultaneous imaging of the sample or subject with accurate alignment of the two images. As another example, microscope 112 may be an miniature optogenetic microscope (e.g., a microscope comprising at least two light sources for imaging and photostimulation), while microscope 110 may be a one-photon or two-photon fluorescence microscope operating at a different fluorescence emission wavelength, thereby allowing simultaneous imaging of neuron activation and fluorescently-tagged biomarker distribution within a common field of view. In instances where microscope 112 is a miniature optogenetic microscope, the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some instances, the adapter thus facilitates, for example, the correlation of image data collected for freely-behaving subjects (using microscope 112) with structural, subcellular resolution image data collected using a two-photon (microscope 110). That is, the adapter facilitates comparison of images collected on two different length scales (cellular and subcellular).

In some instances, microscope 112 may be a fluorescence microscope, e.g., a miniature epifluorescence microscope), and microscope 110 may be a two-photon laser scanning microscope, or component thereof, used to provide photo-stimulation of optogenetically-modified neuronal tissue. In some instances, just the excitation light source for the two-photon microscope, e.g., a laser, may be used in conjunction with the adapter and microscope 110. In some instances, a laser light source or two-photon laser scanning microscope connected to interface 114 of the adapter may be used to provide a train of temporally focused laser pulses, for which axial beam profile may be controlled independently of lateral intensity distribution, to allow fast and selective excitation of individual optogenetically-modified neurons, or sub-cellular compartments thereof. In those instances where microscope 110 is a two-photon laser scanning microscope, or component thereof (e.g., a laser light source), the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some instances, microscope 112 may be a bright-field or fluorescence microscope used for imaging a sample, e.g., a tissue sample, while microscope 110 may be a one-photon or two-photon microscope, e.g., a microscope comprising a scanning laser or patterned excitation light system, used to trigger a light-activated, CRISPR-based transcription system (e.g., the light-activated CRISPR-Cas9 approaches recently described by Nihongaki, et al. (2015), "Photoactivatable CRISPR-Cas9 for Optogenetic Genome Editing", Nature Biotechnology 33, 755-760; and Polstein and Gersbach (2015), "A Light-Inducible CRISPR-Cas9 System for Control of Endogenous Gene Activation", Nature Chemical Biology 11:198-200) for performing light-controlled genome editing in precisely defined subsets of cells, e.g., neurons, in a tissue sample. For example, in some instances microscope 110 may be used to trigger a light-activated, CRISPR-based transcription system for inserting, activating, and/or expressing nucleic acid sequences coding for channelrhodopsins (or other light-activated ion channels and ion pumps) and/or genetically-encoded calcium indicators (e.g., GCamPs) in selected neurons within a field of view, and microscope 112 may be configured to provide both photo-stimulation light for activating channelrhodopsin, thereby exciting the selected neurons, and imaging light for exciting GCamP fluorescence, thereby enabling imaging of neuronal signaling. In some instances, microscope 110 may be a one-photon or two-photon microscope used to trigger a light-activated Cre recombinase transcription system (Edwards, et al. (2009), "Light-Activated Cre Recombinase as a Tool for the Spatial and Temporal Control of Gene Function in Mammalian Cells", ACS Chem. Biol. 4(6):441-5). In these instances, the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some embodiments, the adapter may be used to support a microscope that could be used to capture images from a freely moving subject, as well as a microscope that can be used to capture images from an affixed subject. For instance, an adapter and/or image alignment method as described further herein may be used to allow for freely moving imaging by a miniature microscope and head-fixed imaging by a broad imaging modality that requires head fixation of subjects. The adapter may aid in supporting microscopes that may allow for capturing images using two or more different modalities.

In some instances, the accuracy of alignment/registration of images collected or video data recorded using microscopes 110 and 112, which are optically and/or mechanically coupled using the disclosed adapter may be further enhanced using an appropriate image alignment/registration algorithm to process the data following image acquisition. Images and/or video data may be captured or recorded using any of a variety of digital cameras (e.g., CCD cameras, CMOS cameras, etc.) that are attached to or incorporated into microscopes 110 and 112, and image acquisition and processing software (e.g., ImageJ (National Institutes of Health, Bethesda, Md.), Cell Profiler (the Broad Institute, Cambridge, Mass.), Icy (Institut Pasteur, Paris, France), LabVIEW (National Instruments, Austin, Tex.), MatLab (Mathworks, Natick, Mass.), etc.) known to those of skill in the art. A typical image acquisition workflow for use with the disclosed adapter and microscope imaging systems is illustrated in Example 1 below. A typical image registration workflow for use with the disclosed adapter and microscope imaging systems is illustrated in Example 2 below.

In some instances, operational parameters such as the adjustment of focus for microscopes 110 and/or 112 are performed manually prior to the start of image acquisition. In some instances, the setting of operational parameters such as focus adjustment may be facilitated through the use of real-time (i.e., "live") image acquisition and processing. For example, one application of the disclosed adapter is to compare image and/or video data captured for head-fixed and freely-behaving test subjects, e.g., laboratory animals. To facilitate the ability to focus on specific features and landmarks within the field-of-view during one-photon imaging, a real-time bandpass filter may be implemented that removes background signal and high frequency noise, and stretches the image contrast to facilitate focusing. Note that one-photon images are typically dominated by a bright background which impedes efficient focusing by visual feedback. The real-time image processing functionality (i.e., "live" bandpass filtering of a series of one-photon images) makes it easier to find specific features and landmarks in the specimen that is being imaged. Especially in low brightness images, the use of live filtering can help resolve landmarks and features that are otherwise indistinguishable from the background.

Figure 4:
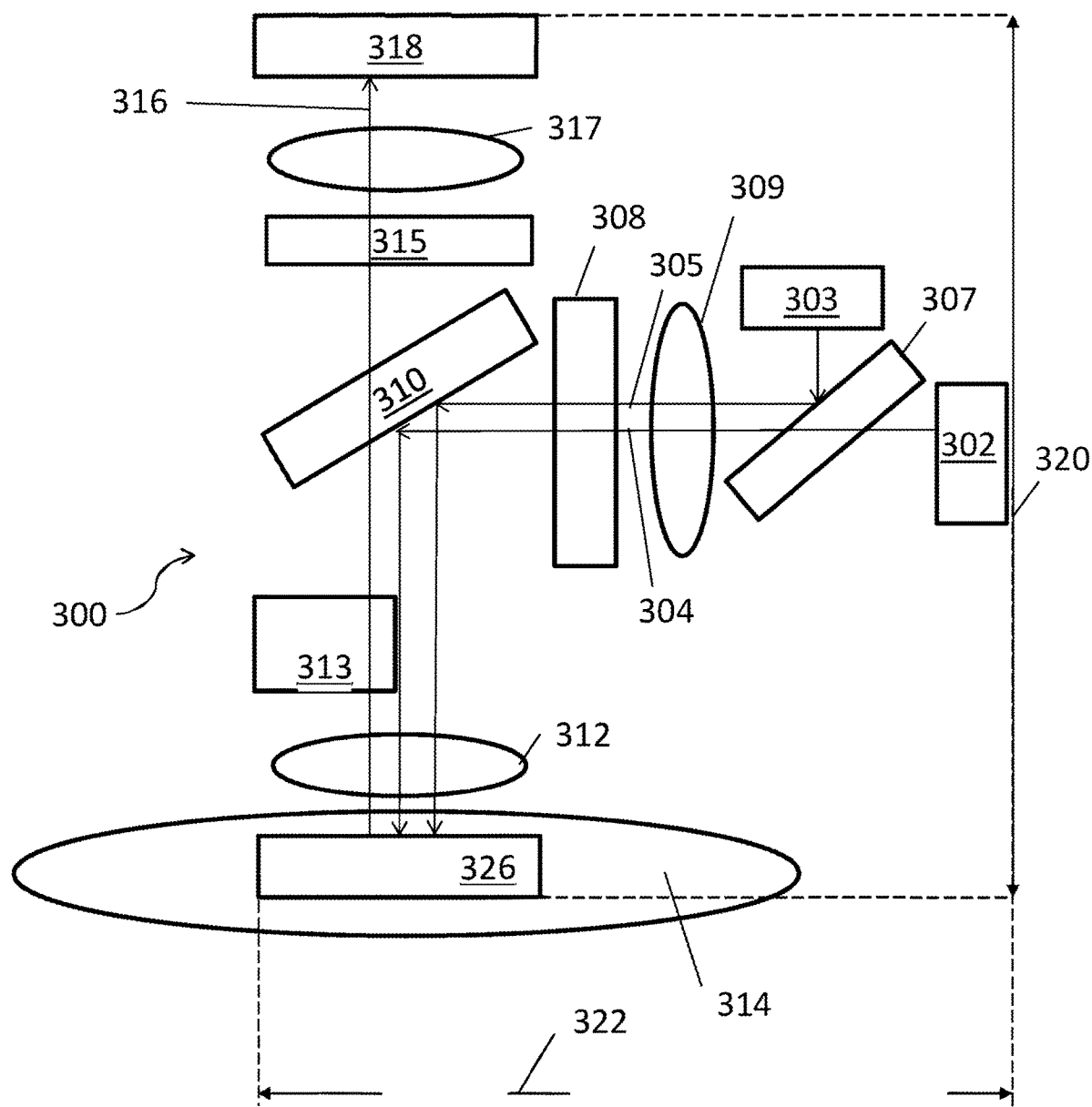
FIG. 4 shows a schematic diagram of an exemplary microscope that may be coupled to the adapter.

FIG. 4 illustrates a microscope that may be coupled to the adapter discussed herein. The microscope system 300 can include a plurality of optical elements (e.g., lenses, filters, mirrors, dichroics, etc.) within the dimensions 320 and 322 for the imaging of a target object 314. The optical elements can include a first optical arrangement 302 (e.g., light sources, diodes, fiber optics) that can generate a first excitation light 304, a second optical arrangement 303 (e.g., light sources, diodes, fiber optics) that can generate a second excitation light 305, a light source combining element 307 (e.g., dichroic filter), a condenser lens 309, an excitation filter 308 (e.g., short pass filter, band pass filter), an objective lens 312, (dichroic beam splitter) mirror 310, a tube lens 315, and an emission filter 317. While the microscope system is shown comprising a first and second optical arrangement, it is to be understand that one, or a plurality (e.g., three or more) of optical arrangements may be included in the microscope system.

The excitation light may induce an emission light 316 from the target object. A light 316 from the target object 314 can be directed from/by the objective lens 312 to an image capture circuit 318. The microscope system 300 may be configured to direct light from and capture image data for a field of view 326. The microscope system can additionally comprise one or more optical elements (e.g., filters) 313 configured to prevent or reduce chromatic aberrations. In some embodiments, the microscope system 300 can be configured to support wireless communication (e.g., via a wireless adapter). The wireless communication can be via a radio frequency or optical link. For example, one or more images captured by the microscope can be wirelessly communicated to an external processor communicatively coupled to a memory with instructions to receive the one or more images.

Not shown is a further dimension, which extends perpendicular to the plane containing dimensions 320 and 322. Although not necessarily limited thereto, each of these dimensions can be less than an inch. In some cases, dimension 320 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, or 5 inches. In some cases, dimension 322 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, or 5 inches. In some cases the dimension extending perpendicular to the dimensions 320 and 322 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, or 5 inches.

The microscope may comprise a housing. The housing may comprise the dimensions 320 and 322. The various elements illustrated in FIG. 4 may be integrated within the housing. The housing may partially or completely enclose the various elements. Optionally, some of the elements may be configured to be coupled to, but external to the housing. For example, light sources, or components of the image capture circuit may be external to the housing. Alternatively, the light sources, or components of the image capture circuit can be partially enclosed by the housing. Optionally, one or more elements can form part of the outer surface of the housing. Components such as the light sources or image capture circuits (e.g. printed circuit board including image sensors) that include electrical parts may be especially susceptible to damage by live beings or external forces.

Figure 8:
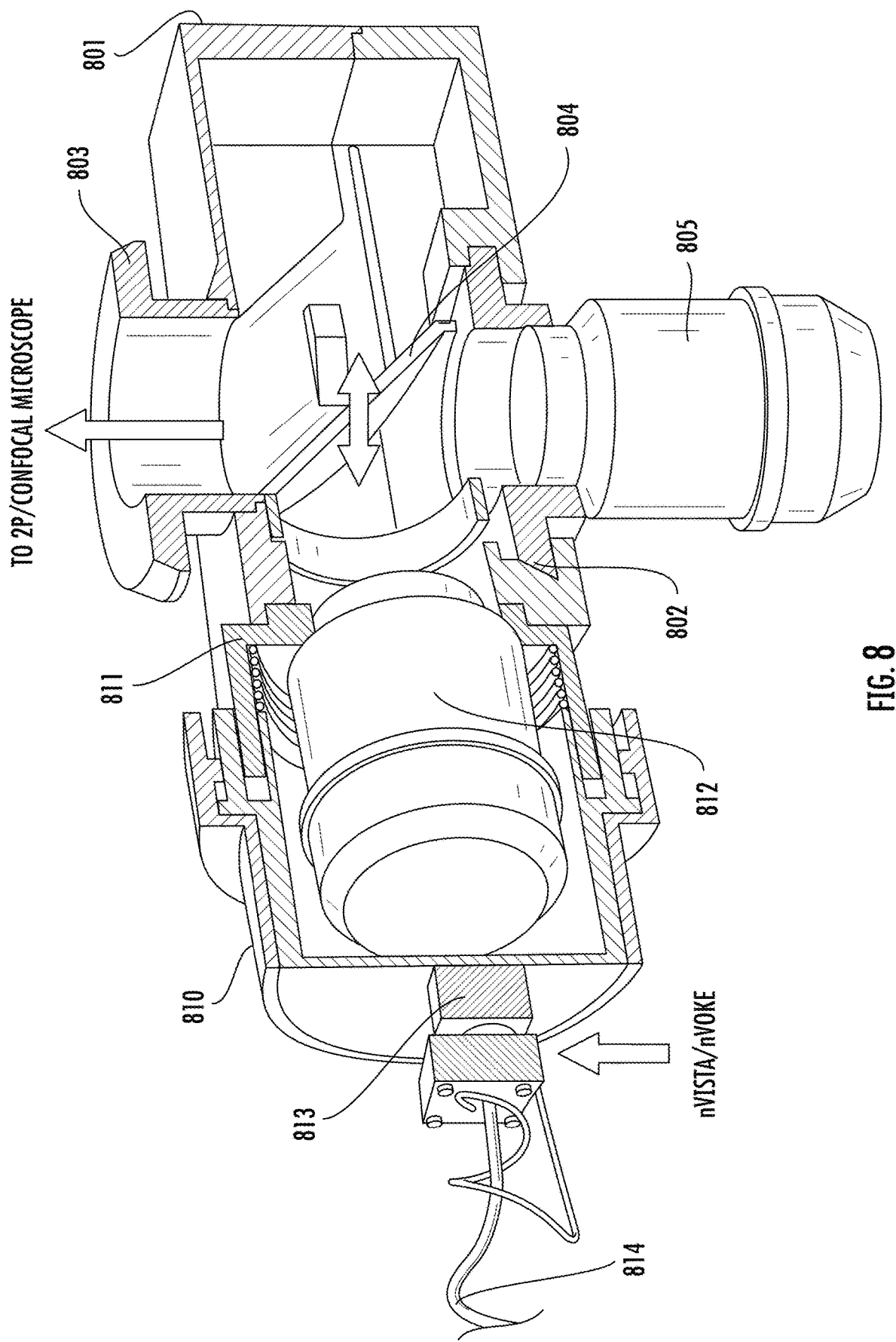
FIG. 8 shows an example of an adapter with a first microscope coupled to the adapter, and an interface for a second microscope.

FIG. 8 shows an example of an adapter with a first microscope coupled to the adapter, and an interface for a second microscope.

An adapter 800 may optionally comprise a first interface 802 configured to accept a first microscope 810 and a second interface 803 configured to accept a second microscope. The interfaces may be arranged on any surface of the adapter as described elsewhere herein. In some embodiments, the first microscope may be a 1-photon microscope supported by the adapter. The first interface may be perpendicular to an interface for an optical probe 805. The first microscope may be supported so that a microscope body is substantially perpendicular to an optical probe body. The first microscope may be supported so that a lens 812, such as an objective lens or any other type of optical arrangement has a viewing axis substantially perpendicular to a viewing axis through an optical probe. A second microscope may be a 2-photon microscope, and may optionally be supported by the adapter. The second interface may be substantially parallel to an interface for an optical probe. The second interface may be on a side of an adapter opposite a side that interfaces with an optical probe. The second microscope may be supported so that a microscope body is substantially parallel to an optical probe body. The second microscope may be supported so that a lens, such as an objective lens or any other type of optical arrangement has a viewing axis substantially parallel to a viewing axis through an optical probe. In some instances, the viewing axes may be co-linear. The first and second microscopes may be positioned so that their bodies are perpendicular to one another and/or non-parallel to one another. The first and second microscopes may be positioned so that their lengths are substantially perpendicular/non-parallel to one another.

The adapter may comprise an optical element 804, such as a mirror, dichroic, or any other optical element, as described elsewhere herein. The optical element may allow images captured via the probe 805 to be simultaneously viewable to the first and second microscopes. The optical element may allow the images captured by the probe to be viewable by the first microscope while not viewable by the second microscope, or vice versa. The optical element may be controlled between different viewing modes. Optionally, the first and second microscopes do not operate independently to capture different images.

The first microscope 810 may comprise an attachment interface 811 that may allow the first microscope to connect to the adapter 801. The attachment interface may come into contact with a first interface 802 of the adapter. The microscope interface may mechanically connect to the adapter interface in a repeatable manner. For example, the interfaces may screw in together, be press-fit, have a snapping feature, having a locking and twisting feature, or any other mechanical feature that may allow the microscope to be attached to the adapter and/or separated from the adapter. The interfaces may come together firmly so that there is little or no wiggling of the microscope with respect to the adapter. A lens 812 of the first microscope may have a fixed position and/or orientation relative to the adapter when the first microscope is attached to the adapter. Alternatively, the lens may be adjustable in a controlled manner. One or more electronic component 813 may be provided on-board the first microscope. For instance, one or more image sensors, light source, circuit board (e.g., PCB) may be provided. One or more connector 814 may optionally be provided for conveying power, light, and/or data. The connector may convey power, light, and/or data to and/or from the microscope. Similar configurations may be provided between the second microscope and the adapter.

Figure 5:
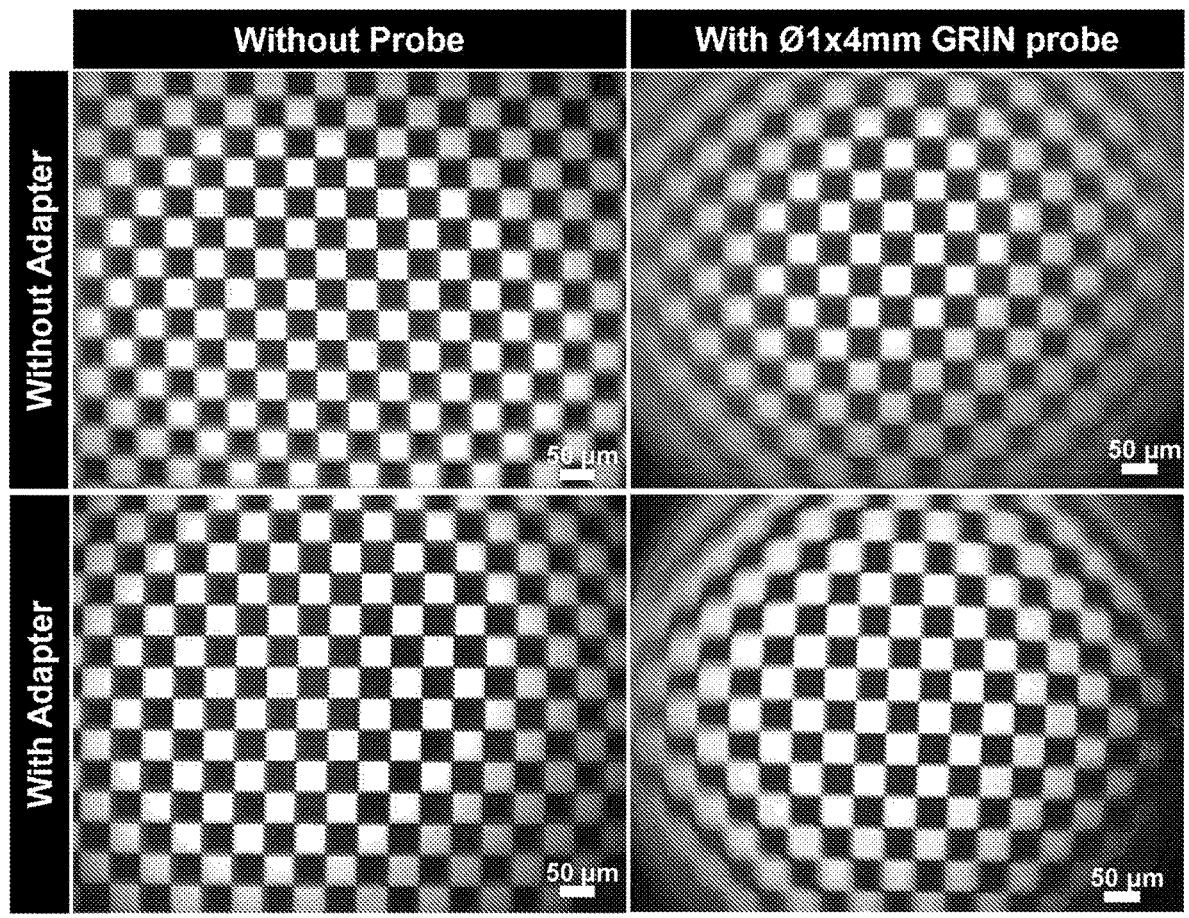
FIG. 5 shows examples of images of a 50 μm pitch test target captured using a miniature microscope with or without use of a 1 mm diameter GRIN probe, and with or without use of the disclosed adapter.

FIG. 5 provides examples of images collected using of images of a 50 μm pitch test target captured using a miniature microscope with or without use of a 1 mm diameter GRIN probe, and with or without use of the disclosed adapter. As can be seen, inclusion of the adapter in the optical path had little or no deleterious effect on the quality of the images captured by the miniature microscope.

Figure 6:
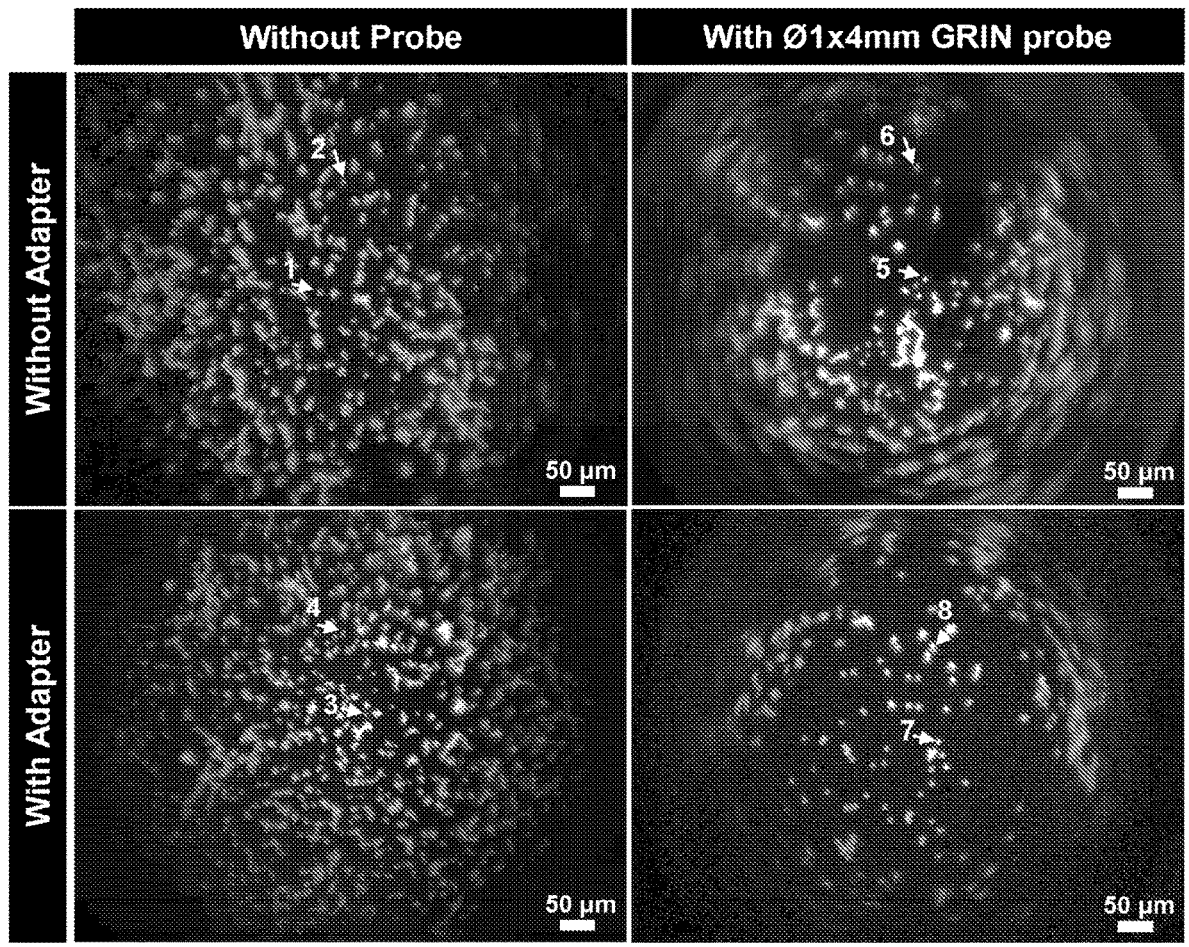
FIG. 6 shows examples of images of 7 μm diameter Dragon Green fluorescent beads captured using a miniature microscope with or without use of a 1 mm diameter GRIN probe, and with or without use of the disclosed adapter.

FIG. 6 provides examples of images of 7 μm diameter Dragon Green fluorescent beads captured using a miniature microscope with or without use of a 1 mm diameter GRIN probe, and with or without use of the disclosed adapter. As can be seen, inclusion of the adapter in the optical path had little or no deleterious effect on the quality of the images captured by the miniature microscope.

Figure 7:
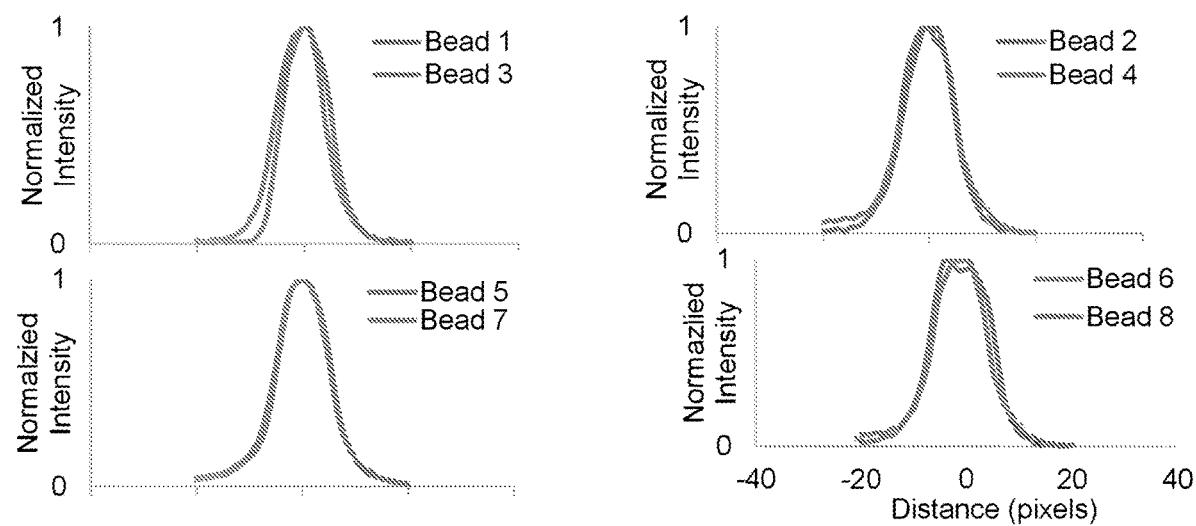
FIG. 7 shows examples of normalized fluorescence intensity plots of the beads indicated in each of the images in FIG. 6.

FIG. 7 shows examples of normalized fluorescence intensity plots of the beads indicated in each of the images in FIG. 6. As can be seen, the normalized intensity profiles for beads imaged with or without the use of the adapter are nearly identical, indicating that there is essentially no image distortion introduced by inclusion of the adapter in the optical path.

In some embodiments, systems and methods may be provided for multi-modal imaging. Multi-modal imaging may be enabled by use of an adapter as described herein. The multi-modal imaging may allow images from a first microscope and a second microscope configured to be interfaced with the adapter to be processed and displayed in a desirable manner. For example, images captured by microscopes of different types may be displayed separately or together. For example, images captured by a one-photon microscope may be displayed together with images captured by a two-photon and/or confocal microscope. Images captured by the different microscopes may be overlaid. In some instances, image-processing steps may be provided to allow the images to be overlaid in a meaningful manner. Functional and structural images may be combined in the overlaid images. In some instances, functional imaging may be used to image physiological activities. For instance, changes in metabolism, blood flow, regional chemical composition, or absorption may be detected or measured. In some instances, tracers or probes may be used to aid in functional imaging. Functional imaging may be used to diagnose metabolic diseases and lesions on a finger scale, and/or for neurological and cognitive psychology research. Structural imaging may deal with the structure of tissues and/or organs, such as structure of the nervous system. The structural imaging may be useful for diagnosis of intracranial disease and/or injuries. Functional and structural imaging may be used in conjunction to provide a robust image of the underlying structure and/or activity, such as brain imaging.

Figure 9:
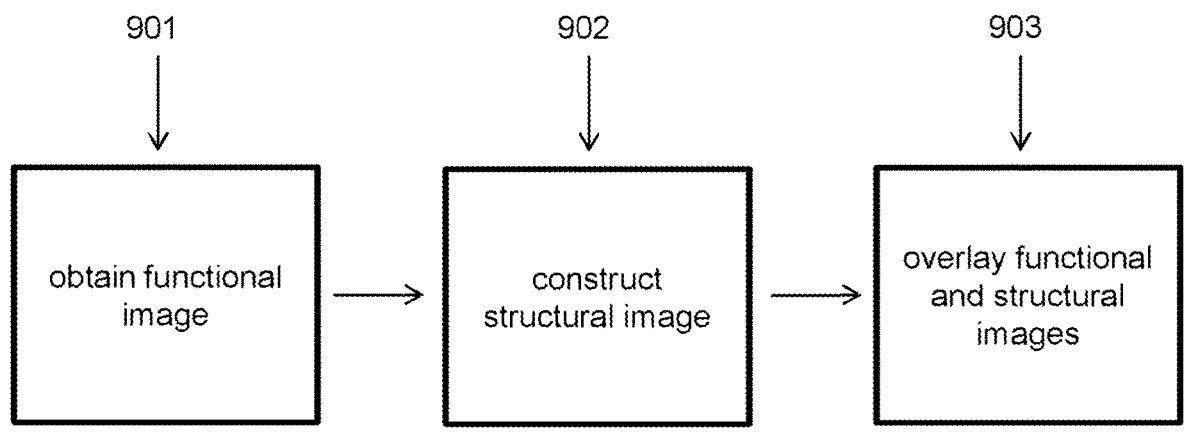
FIG. 9 shows an example of a process for multi-modal imaging using functional data and structural data from a microscope.
Figure 10A:
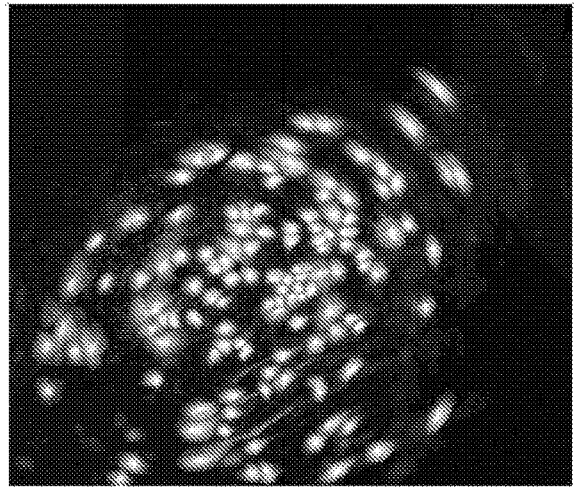
FIG. 10A shows an example of a functional image.

FIG. 9 shows an example of a process for multi-modal imaging with functional imaging data. A functional image is obtained 901. An example of the functional image is shown in FIG. 10A. The functional image may be a cell map. The cell map may be obtained with aid of an Inscopix Data Processing Software (IDPS). The image may have undergone one or more of the following: preprocessing, motion correction, cell identification, and so forth. The image may be captured with aid of a 1-photon microscope or any other microscope. The image may be captured with aid of a microscope, supported by an adapter, as described elsewhere herein.

Figure 10B:
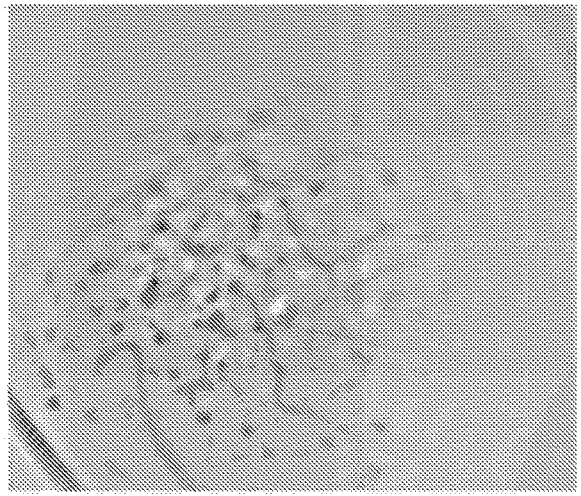
FIG. 10B shows an example of a structural image.

A structural image may be constructed 902. The structural image may be a mean projection of a motion corrected movie, or a maximal projection of a static z-stack images. The movie may be taken with aid of a microscope supported by the adapter, as described elsewhere herein. The microscope may be a 1-photon microscope or any other type of microscope. The motion corrected movie may or may not include the functional image that was taken. An example of a structural image is shown in FIG. 10B.

The functional and structural images may be captured and/or processed sequentially or in parallel. Any order of image capture and/or processing may be provided.

Figure 10C:
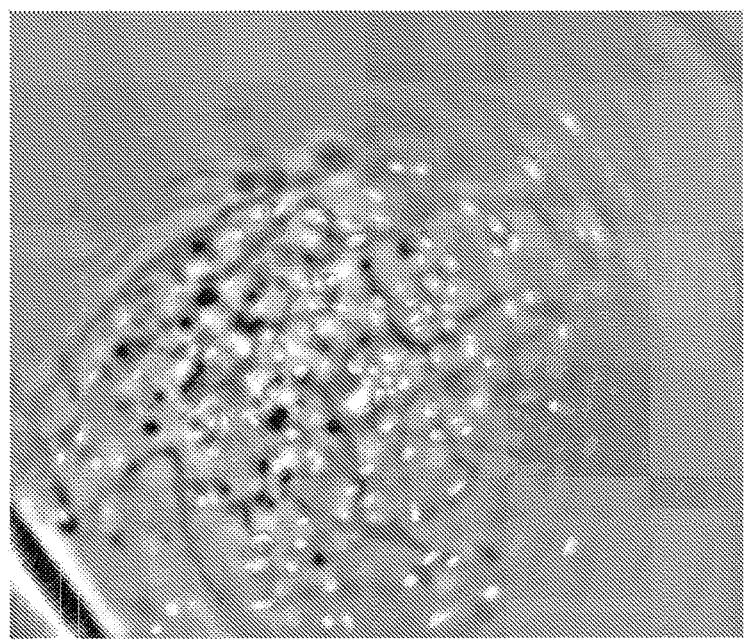
FIG. 10C shows an example of an overlaid image using the functional and structural image.

The functional image and the structural image may be overlaid. An example of the overlaid image is shown in FIG. 10C. In some embodiments, adjustments may be made to overlay the images. Corresponding features may or may not be recognized and necessary transformations to the figures may or may not be taken to allow the overlay to correspond. The overlaid image may be referred to as a first overlaid image.

Figure 11:
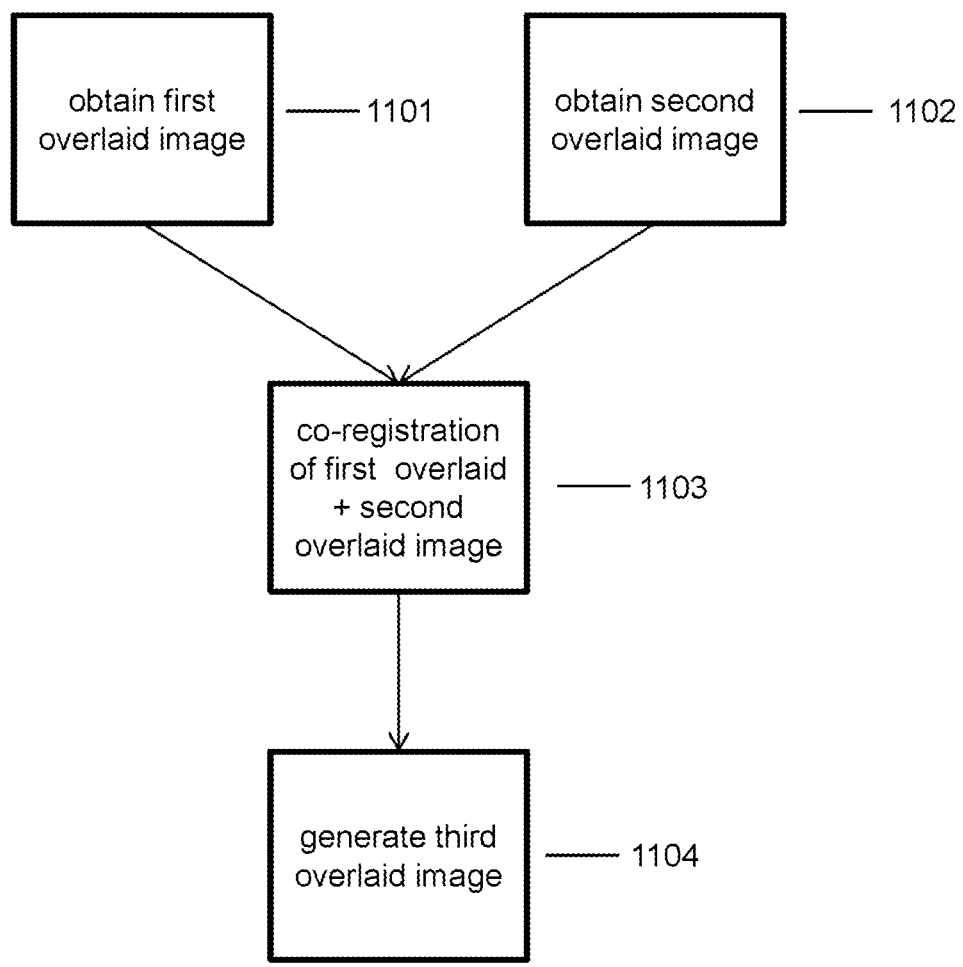
FIG. 11 shows an exemplary process for multi-modal imaging using images from a first microscope and a second microscope.

FIG. 11 shows an additional example of a process for multi-modal imaging registration. A first overlaid image may be obtained 1101. In sequence or in parallel, two-photon (2p)/confocal data may be processed to obtain a 2p/confocal image (a.k.a. second overlaid image) 1102. Any order of image capture and/or processing may be provided. Co-registration of the first overlaid image and the 2p/confocal image may occur 1103. A third image overlay may be generated 1104.

A first overlaid image may be obtained 1101. The first overlaid image may be obtained using a process as described in FIG. 9. The first overlaid image may include an overlay of a functional image and a structural image.

The 2p/confocal data may be processed. Processing of 2-photon/confocal data may include obtaining a structural image. Initially, structural data may be obtained. The data may be read to obtain a z-stack. In one example, for Zeiss .czi data, an open source python API may be utilized.

Figure 12A:
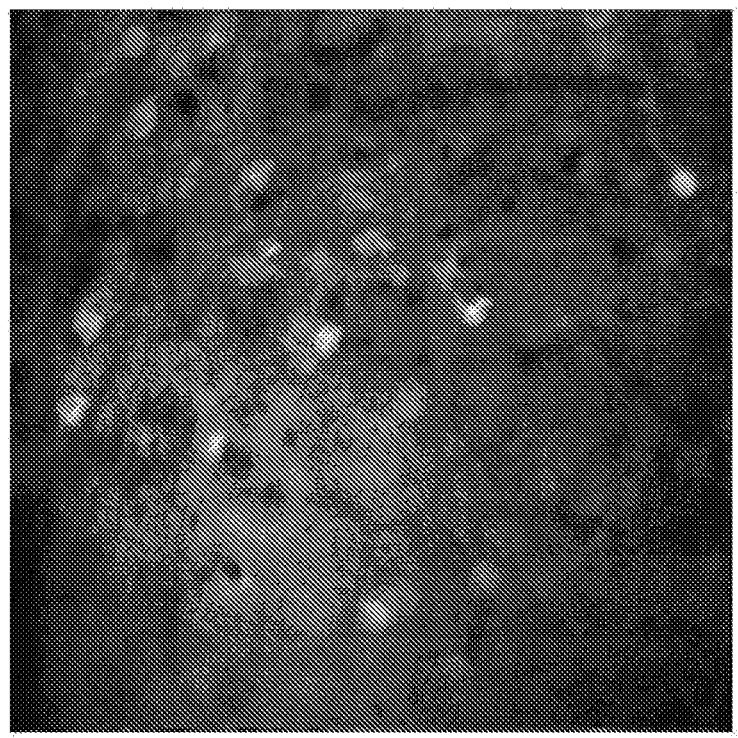
FIG. 12A shows an example of an image that may be selected from the series of projection images.

A number (n) of z-layers may be chosen. The number (n) of layers may be chosen to generate a maximal (or improved) projection of the structural image that may cover a chosen thickness of tissue. For example, the chosen thickness of tissue may be greater than, less than, or approximately equal to about 10 um, 15 um, 20 um, 25 um, 30 um, 35 um, 40 um, or 50 um. The chosen thickness may match a focal depth of an image captured by a microscope described elsewhere herein. If the total z-stack is larger than the chosen thickness (e.g., any of the values described herein), a series of projection images may be generated with a sliding window of size (n). These series of projection images may be navigated to identify the image with obvious landmarks (e.g., blood vessels or other structures) that best resembles those in the structural image. FIG. 12A shows an example of an image that may be selected from the series of projection images. Such image selection may be made manually. For instance, a user may view the series of images and select the image. In some instances, the image selection may be made with one or more image analysis algorithms. The image analysis algorithms may analyze the series of pictures and select the image based on one or more criteria. One or more processors may aid in the analysis of the images.

Figure 12B:
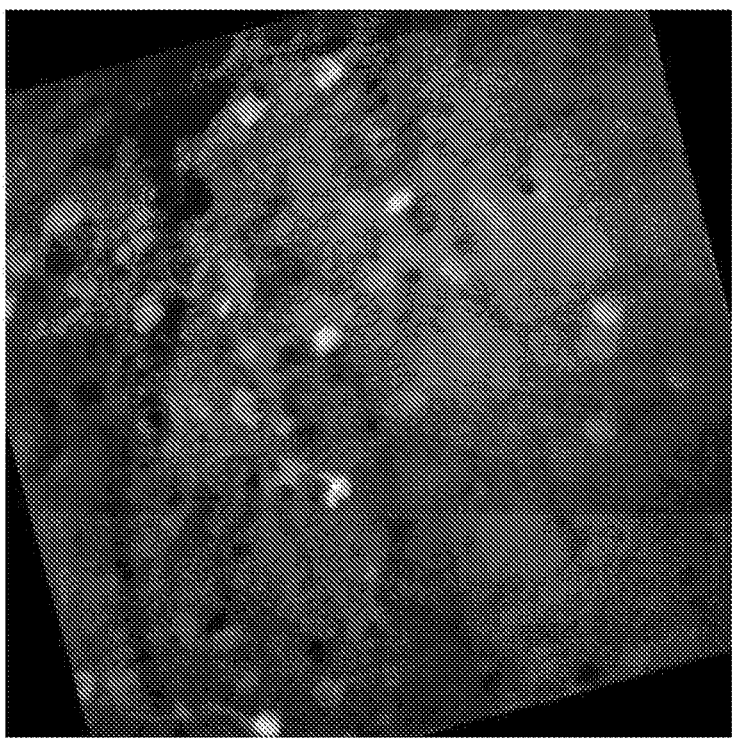
FIG. 12B shows an example of a 2p/confocal structural image that has been re-oriented to match a first structural image.

An estimated flip/rotation may occur between a first microscope structure image and a 2p/confocal structural image. Such an estimated transformation (T) may be applied to the 2p/confocal structural image. Effecting the transformation to the 2p/confocal structural image may cause it to be of the same orientation as the first structural image used in the first overlaid image. The first structural image and the 2p/confocal image may then be at the same orientation. They may or may not have some differences in scale, elastic deformation, or require some fine translation. FIG. 12B shows an example of the 2p/confocal structural image that has been re-oriented to match the first structural image.

Processing of 2-photon/confocal data may include obtaining a functional image. Initially, functional data may be obtained. The functional data may have any format, such as a movie (e.g., video file). The format of the functional data may be converted as desired. For instance, the functional data may be converted from a movie to an .isxd movie, .tiff sequence, or .hdf5. In some instances, the functional data may be initially presented in a desired format and may not require format conversion. The functional data in a desired format may be a functional recording.

A functional image processing pipeline may be used to get a cell map for each functional recording. The image may have undergone one or more of the following: preprocessing, motion correction, cell identification, light balancing, and so forth. If multiple functional recordings at a sequential depth exist, each functional recording may be processed one by one (e.g., sequentially). The functional recordings may be processed one by one if the multiple functional recordings are not products of simultaneous volumetric functional image.

Figure 13A:
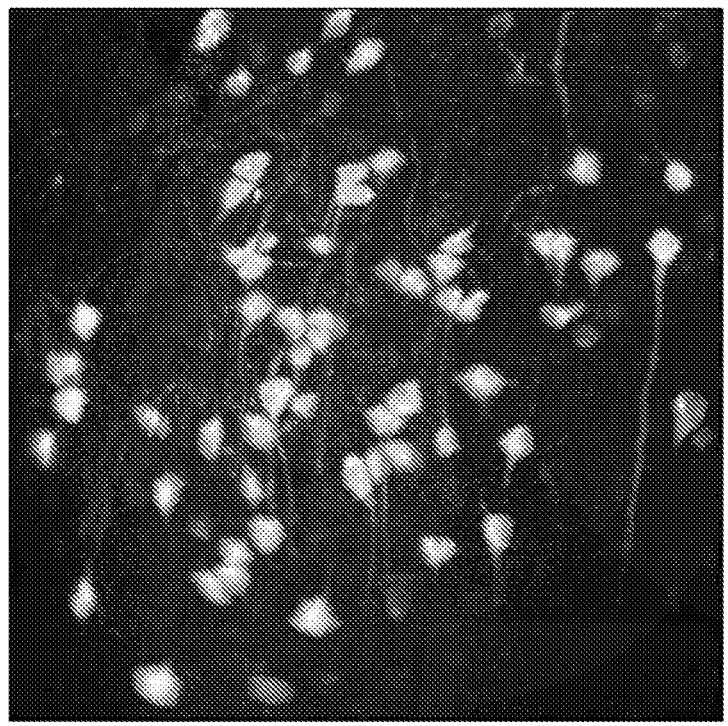
FIG. 13A shows an example of a functional cell map.

The cell maps may be registered. The registered cell maps may be padded into the same size (e.g., may be converted to be the same as needed). The various cell maps may be projected into a single functional cell map. For instance, the cell maps obtained from each functional recording may be projected into a single functional cell map. FIG. 13A shows an example of a functional cell map.

The transformation (T) that was utilized when transforming the 2p/confocal structural image may be used to transform the functional cell map. Thus, the functional cell map may be reoriented in the same manner as the 2p/confocal structural image was reoriented. The transformation (T) that was utilized when reorienting the 2p/confocal structural image may be stored, and may be accessed when determining how to orient the functional cell map.

Figure 13B:
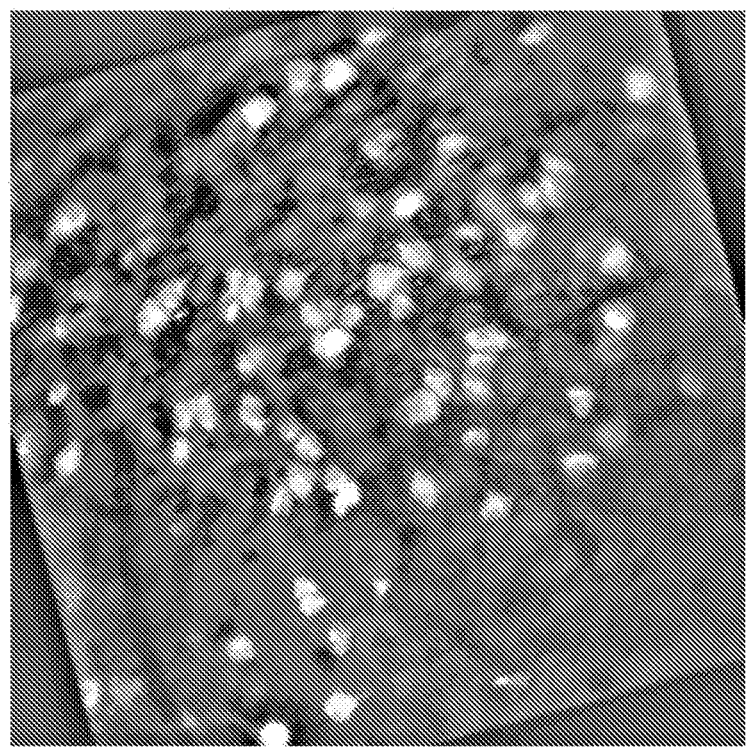
FIG. 13B shows an example of a functional and structural overlaid two-photon/confocal image.

The 2p/confocal structural image may have a higher resolution than the functional cell map. Alternatively, they may be of similar resolutions, or the functional cell map may have a higher resolution. The 2p/confocal structural image may be rescaled to be the same size as the functional cell map, or vice versa. The re-scaling may be needed in order to overlay the images. If any distortions need to be removed, or if any translations are needed, these may occur as well, to allow for overlay of the images. FIG. 13B shows an overlay of the images. This overlaid image may be referred to as a 2p/confocal image, or a second overlaid image.

Figure 14:
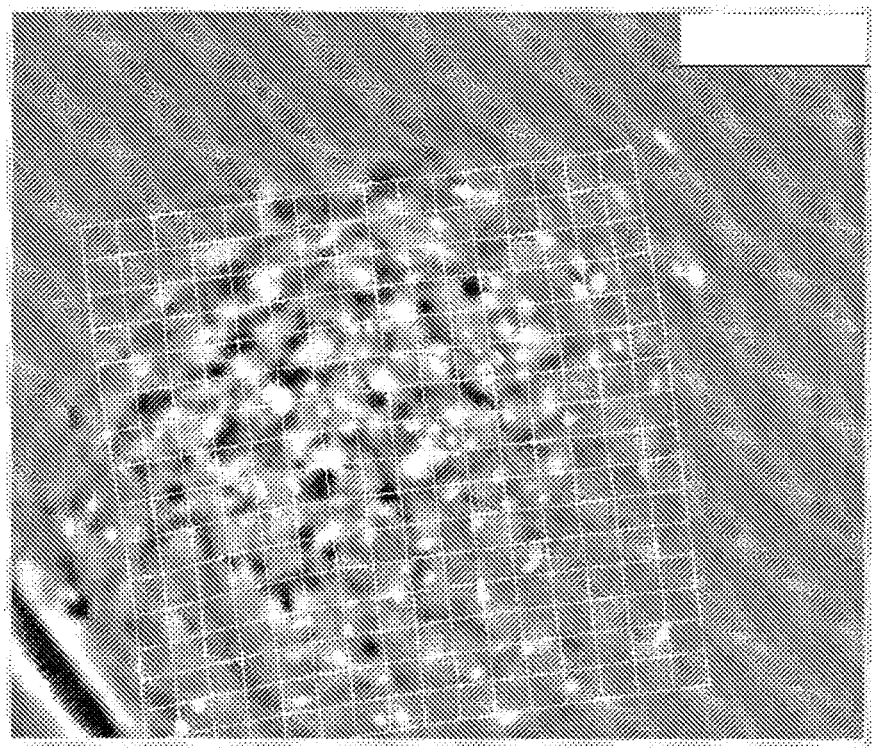
FIG. 14 shows an example of an elastic transformation.
Figure 14:
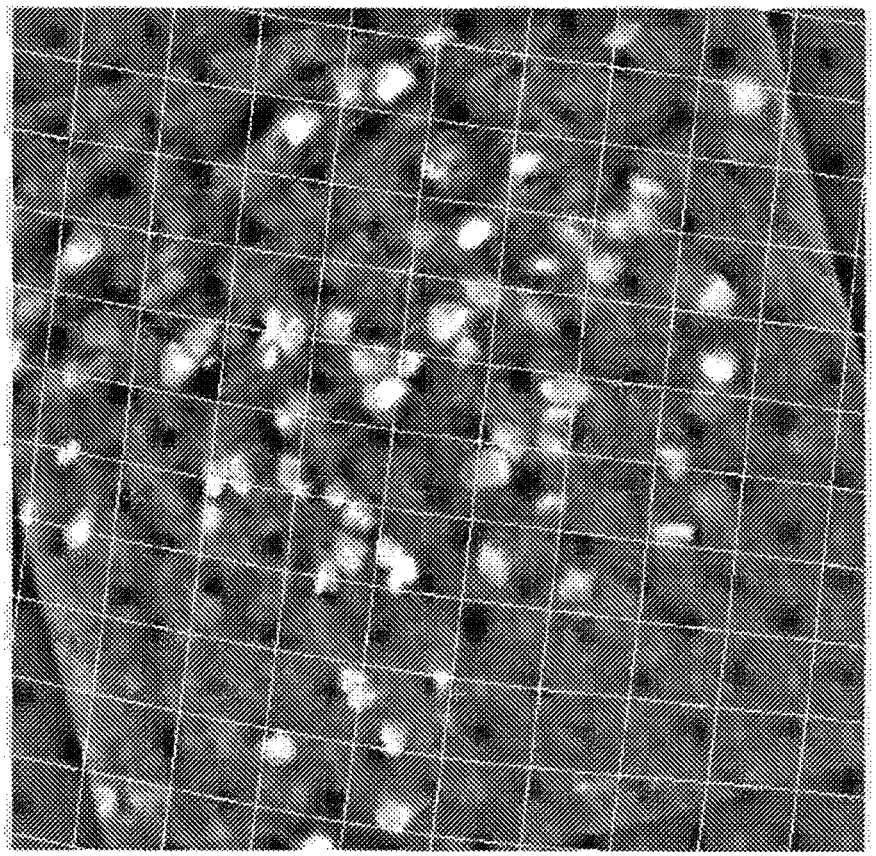

The first overlaid image and the 2p/confocal image may be co-registered 1103. The co-registration may ensure that any distortions are removed, or translations are provided to allow for overlay of the images. For instance, the 2p/confocal image and the first overlaid image may be opened and go through unwarping software. For instance, the images may be opened in a program such as ImageJ (Fiji distribution which may include bUnwarpJ plug-in). A new bUnwarpJ window may pop up. The 2p/confocal image may be selected as a source image and the first overlaid image may be selected as a target image. A tool, such as a 'pen icon' from the menu may be used to set one or more landmarks. It may be desirable to select 3-4 clear landmarks. For instance, for each landmark, a marker may be provided on the first overlaid image. Then the user may switch to move the marker and move the corresponding landmarks on the 2p/confocal image. An input/output menu may be selected. The landmarks may be saved in a memory. A landmark weight may be set. For example, a landmark weight may be set to 10. The image weight may be gradually increased (e.g., start from 0.01). An option may be provided to save transformations. For instance, FIG. 14 shows an example of elastic transformation.

In some embodiments, the images captured using the one or more microscopes described herein may be co-registered by dividing the images into a plurality of sections or quadrants and performing image registrations for each section or quadrant independently. In some cases, one or more non-linear aberrations may be introduced into the images by the different lenses and/or optical paths of the miniscopes and two photon (2P) microscopes used to capture the images. This may result in highly local differences across the images. Dividing the images into smaller images that are independently warped and registered can result in a better approximation of different optical aberrations within the images captured using the miniscopes and 2P microscopes of the present disclosure.

An image may be divided into any number of sections. For example, an image may be divided into at least about 2, 3, 4, 5, 6, 7, 8, 9, 10, 11, 12, 13, 14, 15, 16, 17, 18, 19, 20, 30, 40, 50, 60, 70, 80, 90, 100 or more sections. Alternatively or in addition, an image may be divided into at most about 100, 90, 80, 70, 60, 50, 40, 30, 20, 19, 18, 17, 16, 15, 14, 13, 12, 11, 10, 9, 8, 7, 6, 5, 4, 3, 2 or fewer sections. The divided sections may or may not be uniform in size and/or shape. A section may have any size or shape.

Figure 15A:
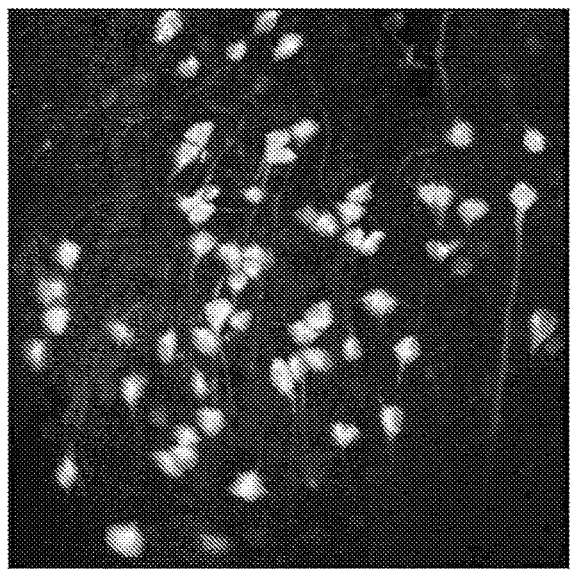
FIG. 15A shows an example of a to-be-transformed image.
Figure 15B:
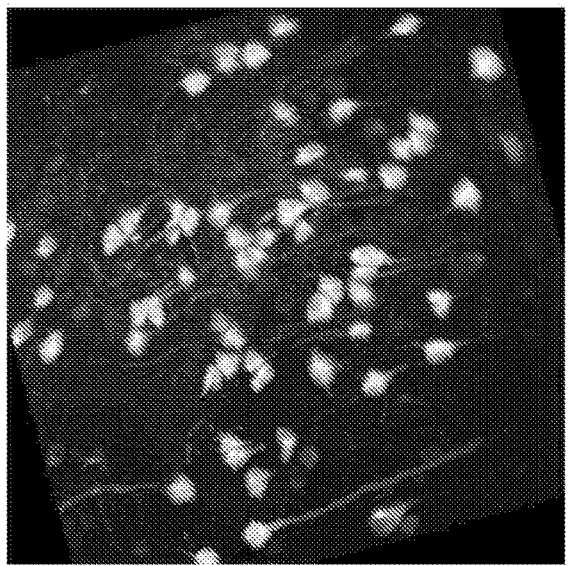
FIG. 15B shows an example of the transformed image.

An overlay of the first overlaid image and the 2p/confocal image may occur to yield a third overlaid image 1104. Before the overlay, the saved transformation may be saved to the source image first. As previously described, the 2p/confocal image may be selected as the source image. In Fiji ImageJ, the target image and the source image may be opened. FIG. 15A shows a to-be-transformed image. The bUnwarpJ plug-in may be opened, the saved landmarks file may be loaded, and the corresponding elastic transformation file may be loaded. The transformed image may be saved. FIG. 15B shows an example of the transformed image.

Figure 15C:
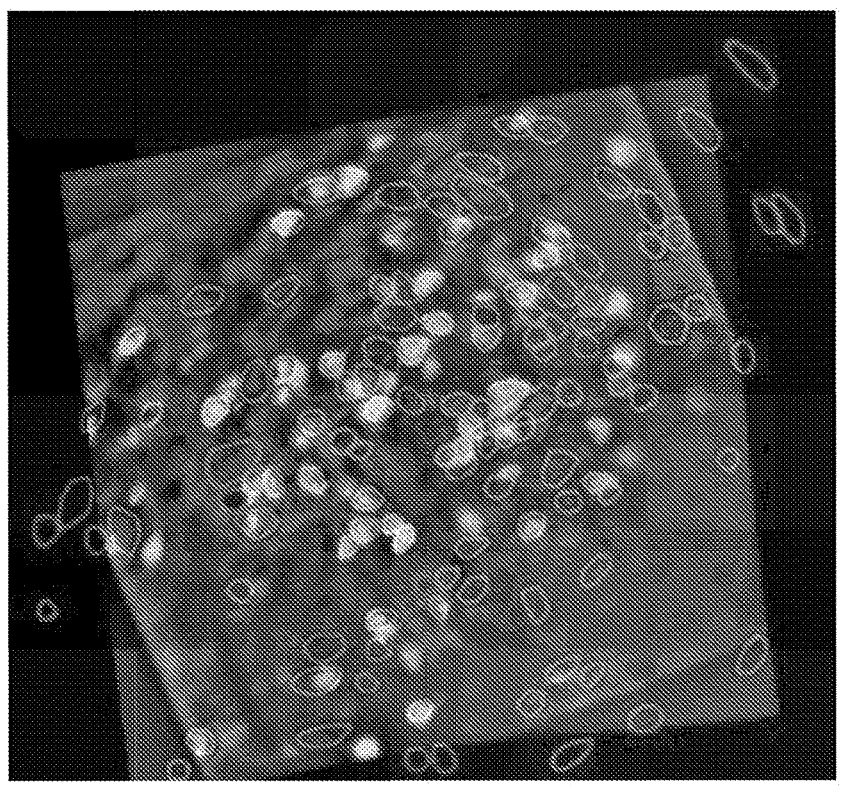
FIG. 15C shows an example of an overlay of a two-photon/confocal image (green) with a one-photon miniscope functional cell contours (red).

To generate the third overlay (i.e., the overlay of the first overlaid image and the 2p/confocal image), the first overlaid image cell map may be set in the red channel and the second overlaid image (2p/confocal image) cell map may be set in the green channel. FIG. 15C shows an example of the third overlaid image, while the red only show the map of the cell contour for easier visualization.

In any of the embodiments described herein, one or more transformations may be applied to align two or more images captured using any one or more microscopes of the present disclosure. The two or more images may comprise a functional cell map or image. The two or more images may comprise a structural cell map or image. In some embodiments, the two or more images may comprise the first overlaid image and/or the second overlaid image. The first overlaid image may correspond to an overlay of a functional cell image and a structural cell image. The second overlaid image may correspond to an overlay of a functional cell image and a structural cell image. The second overlaid image may comprise a two photon (2p)/confocal image as described above.

One or more landmarks that appear in the two or more images may be used to determine or generate a set of coordinate transformations for aligning the two or more images. In some embodiments, a ground-truth dataset may be generated and used to characterize a transformation between (i) images obtained using a miniature microscope and (ii) images obtained using another microscope (e.g., a two photon (2P) microscope). The ground-truth dataset may be generated using the one or more landmarks. The one or more landmarks may comprise a cell or a neuron that appears in the two or more images. In some embodiments, the ground-truth dataset may be used to characterize a transformation between two or more images obtained using one or more optical imaging modalities. The transformation may be characterized with respect to an image generated using a single imaging modality or with respect to a plurality of images generated using a plurality of different modalities. For example, the respective transformations for the respective images obtained using a set of optical image modalities may each be characterized with reference to the same reference data.

In some embodiments, generating a ground-truth dataset may comprise determining that 'cell X' in a first image (e.g. an image taken with a miniscope) is the same as 'cell Y' in a second image (e.g. an image taken with a two photon (2P) microscope) and correlating such data. In some embodiments, generating the ground-truth dataset may comprise observing a unique, measurable quality of a set of neurons in the first image and/or the second image, independent of the neuron's location and shape. For example, the unique, measurable quality may be measured for each neuron in the first image and/or the second image, independent of the neuron's location and shape. This may be achieved by imaging in visual cortex where individual neurons have specific tuning properties based on an orientation of light stimuli. Any of the imaging modalities described herein (e.g., miniscope and 2P) may be used to capture a neuron's response to light stimuli and define its tuning curve. Identical neurons in two or more images captured using different optical modalities may be identified by finding matching cells (in a same or similar local area) with a same or similar tuning curve generated in response to light stimuli. A ground-truth dataset may be generated by measuring a single unique, measurable quality or a plurality of unique, measurable qualities (e.g., responses to different types of light stimuli or other stimuli, etc.). For example, where a plurality of unique, measurable qualities are measured, a ground-truth dataset may be generated for each unique, measurable quality, and then each or a subset of the ground-truth datasets may be processed to generate one or more consensus ground-truth datasets. For example, such consensus ground-truth datasets may rule out outlying datasets (e.g., when it turns out the 'unique, measurable quality' used to generate that dataset was in fact not unique and introduced error). In some embodiments, the ground-truth dataset may be provided to and/or used with supervised machine learning algorithms (e.g., convolutional neural networks) to characterize and/or apply one or more coordinate transformations in order to align the two or more images captured using different microscopes or different optical modalities.

In some embodiments, the ground-truth dataset may be used to characterize a distribution of distances corresponding to an amount or a degree by which cells are 'warped' between different optical imaging methods. That is, after the two or more images have been aligned and registered, the ground-truth dataset may be used to determine how far apart the centers of the cell contours are across the two or more images captured using different optical imaging modalities. The distribution of distances may be used to refine or enhance the search for candidate matches. In some embodiments, the ground-truth dataset may be used to train convolutional neural networks to determine how the size, shape, position, and/or orientation of neurons in the images are altered between the two optical imaging modalities, given the location of the neurons in the field of view. Knowing how the sizes, shapes, positions, and/or orientations of the neurons are altered between different optical imaging modalities may help to determine, for example, how a circular cell contour in a two photon (2P) image could be distorted or modified (e.g., by becoming elongated at the edges of a miniscope image). This approach may be combined or used with any of the embodiments described herein to more accurately search for and identify the same cells in aligned, registered images that are taken with the miniscope and 2P microscopes and that have the same or similar field of view.

Images from the first microscope and the second microscope may be processed substantially simultaneously or in sequence. The images may be processed as they are received. The images may be stored and/or processed at a later time. The image processing may be initiated by a user, or may automatically be initiated in real-time or upon detection of an event.

Images from different microscopes may be processed and/or overlaid as described herein. Any type of microscopes may be utilized. For instances, the microscopes may include a one-photon and a two-photon/confocal microscopes. The microscopes may include a miniaturized microscope that allows for a subject to be freely moving, as well as a microscope that requires for at least a portion of the subject to be immobilized or motion-restricted. In some embodiments, one or both of the microscopes may be capable of collecting three-dimensional data. For instance, a first microscope and/or a second microscope may capture three-dimensional imaging data. The multi-modal imaging techniques as described herein may apply to any combination of images collected by various microscopes, which may include three-dimensional data. In some instances, collected three-dimensional data may be kept in three-dimensions, rather than being projected to two-dimensions, and registration algorithms that can handle three-dimensional images can be applied.

The images from the microscopes may be captured at substantially the same time, or at different times. An adapter may support both microscopes while the images are being captured. Alternatively, the microscopes may capture images without aid of an adapter. The adapter may advantageously ensure that the microscopes are capturing images of the same region. Both microscopes may share an optical probe which may ensure that the images captured by the microscopes are of the same location. For instance, a location may be a portion of a brain of a subject. When both microscopes are capturing images simultaneously, they may be capturing images at the same time of the same location. When the microscopes are collecting data without aid of an adapter, they may optionally not be capturing images of the exact same location. They may capture images of approximately the same location and image recognition and/or alignment techniques may be utilized to aid in creating the image overlays. For instance, a user may manually view the images and indicate a region of the images that overlap, and then further fine-alignment may be performed with aid of one or more algorithm. Alternatively, an algorithm may be used to recognize which portions of the images overlap, and then further fine tuning of the images to create the overlays may occur. In some instances, vasculature, or one or more landmarks in the images may be identified or selected, to aid in the high-level location of the areas of the images to be co-registered. Then further fine-turning may occur as described herein, and used to create the overlaid images.

Even when an adapter is not utilized, both image modalities may be for the same subject, such as the same living animal. When the images are taken at different points in time with different microscopes, the animal may be freely moving for the different microscopes, may be partially or completely immobilized (e.g., head-fixed) for the different microscopes, or may be freely moving for one microscope while partially or completely immobilized for the other microscope. In some instances, the subject may be living for each of the images captured using the different modalities. Alternatively, the subject may be sacrificed and not living for each of the images captured using the different modalities. Alternatively, the subject may be living when images captured using the first image modality, and may have been sacrificed when images are captured using the second image modality. In some instances, it may be advantageous to capture images using a first modality while the subject is alive. Then the subject may be sacrificed. The brain or other imaging areas of the subject may be fixed and cleared by treating the brain in chemicals. Then the image of the whole brain or the corresponding area (that matches the imaging area of the first imaging modality) may be captured using the second modality. In some instances, both the first and second imaging modalities may be used after sacrifice, but prior to and subsequent to clearing the brain, respectively. Any description herein of multi-modal imaging and alignment and overlays, may apply to any type of imaging, with any type of circumstances, such as those described herein.

Any of the images described herein may be displayed on a user interface. The images may optionally be displayed in color on the user interface. The user interface may be local or remote to the microscopes and/or adapter. The user interface may be on an electronic device or computer system as described elsewhere herein.

In some instances, the images may be displayed on a user interface substantially in real-time. The images may be displayed within 1 hour, 30 minutes, 15 minutes, 10 minutes, 5 minutes, 3 minutes, 2 minutes, 1 minute, 30 seconds, 15 seconds, 10 seconds, 5 seconds, 2 seconds, 1 second, 0.5 seconds, 0.1 seconds, 0.05 seconds, or 0.01 seconds of the images being captured by the microscopes. The overlaid images may be displayed in substantially real-time, such as any of the time periods listed above. Alternatively, the images may be stored and processed at a later time. The images may be displayed on any device that may be capable of accessing the images captured by the microscopes. The microscopes may convey image data in a wired or wireless manner. The images may be transmitted to an electronic device, such as a computer. The images may or may not be transferred with aid of a communication hub that may receive wired or wireless communications from one or more microscopes or adapters. The systems and methods provided herein may occur automatically without requiring human interaction or just requiring minimal human interaction. This may allow for the use of the adapter to aid in imaging from different types of microscopes and providing an overlaid image that may provide meaningful data.

Any of the steps and/or processes provided herein may take place on-board or off-board any of the devices described herein. For instances, one or more of the steps described herein may take place on-board the first microscope, the second microscope, the adapter, a communication hub, or any device in communication with any of the above. In some instances, one or more of the steps may take place on-board a computer, server, or cloud-computing infrastructure.

Figure 16:
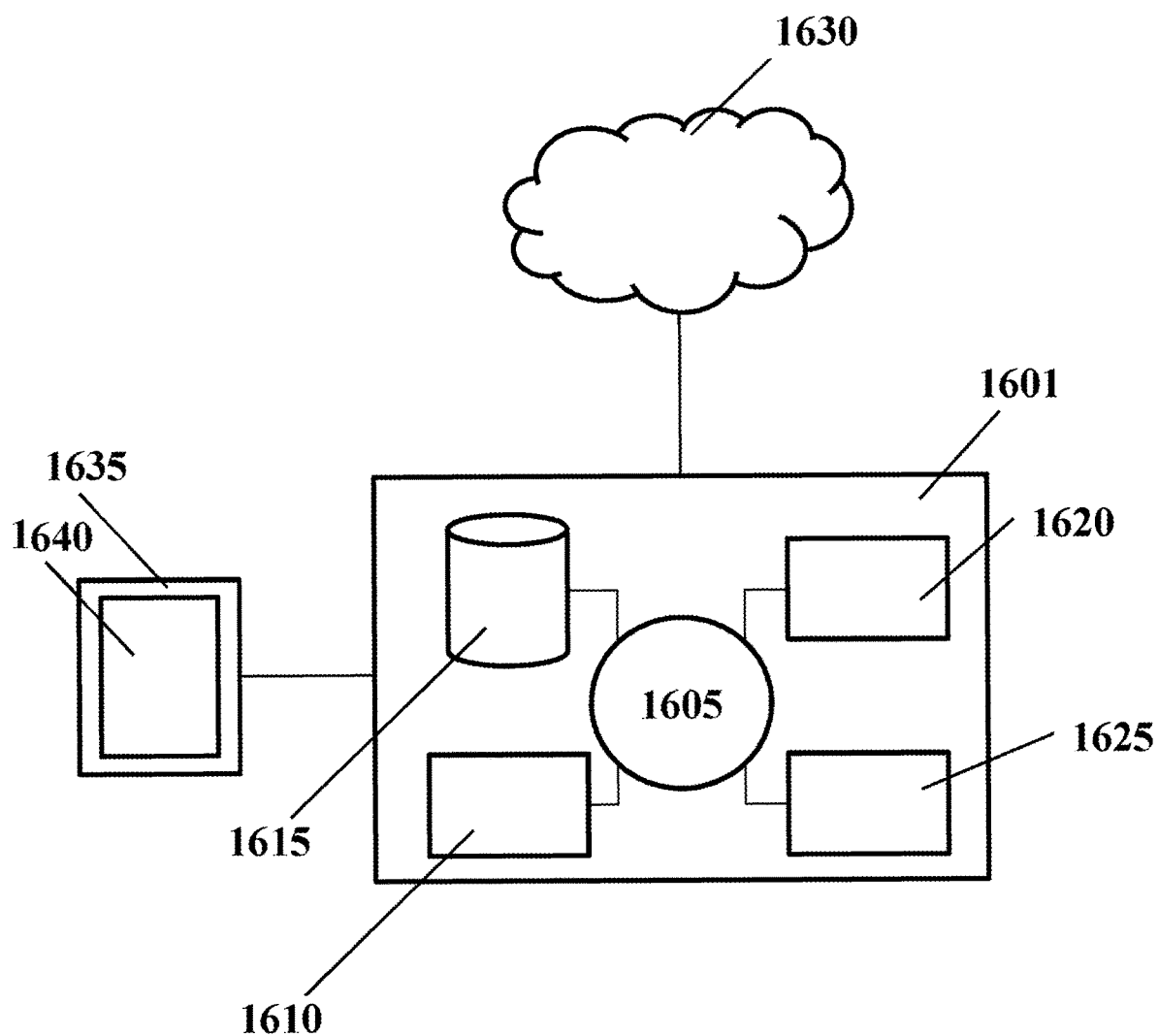
FIG. 16 shows an exemplary computer system for use in systems and methods provided herein, in accordance with embodiments of the invention.

The present disclosure provides computer systems that are programmed to implement methods and systems of the disclosure. FIG. 16 shows a computer system 1601 that is programmed or otherwise configured to implement a model management system as described above. The computer system 1601 can regulate various aspects of the present disclosure, such as, for example, implementing various steps relating to image acquisition, processing, overlay, rendering, and the other functions as described elsewhere herein. The computer system 1601 can be an electronic device of a user or a computer system that is remotely located with respect to the electronic device. The electronic device can be a mobile electronic device. The electronic device can be a microscope, adapter, communication hub, or any other device.

The computer system 1601 includes a central processing unit (CPU, also "processor" and "computer processor" herein) 1605, which can be a single core or multi core processor, or a plurality of processors for parallel processing. The computer system 1601 also includes memory or memory location 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The computer system 1601 can be operatively coupled to a computer network ("network") 1630 with the aid of the communication interface 1620. The network 1630 can be the Internet, an internet and/or extranet, or an intranet and/or extranet that is in communication with the Internet.

The network 1630 in some cases is a telecommunication and/or data network. The network 1630 can include one or more computer servers, which can enable distributed computing, such as cloud computing. For example, one or more computer servers may enable cloud computing over the network 1630 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1630, in some cases with the aid of the computer system 1601, can implement a peer-to-peer network, which may enable devices coupled to the computer system 1601 to behave as a client or a server.

The CPU 1605 can execute a sequence of machine-readable instructions, which can be embodied in a program or software. The instructions may be stored in a memory location, such as the memory 1610. The instructions can be directed to the CPU 1605, which can subsequently program or otherwise configure the CPU 1605 to implement methods of the present disclosure. Examples of operations performed by the CPU 1605 can include fetch, decode, execute, and writeback.

The CPU 1605 can be part of a circuit, such as an integrated circuit. One or more other components of the system 1601 can be included in the circuit. In some cases, the circuit is an application specific integrated circuit (ASIC).

The storage unit 1615 can store files, such as drivers, libraries and saved programs. The storage unit 1615 can store user data, e.g., user preferences and user programs. The computer system 1601 in some cases can include one or more additional data storage units that are external to the computer system 1601, such as located on a remote server that is in communication with the computer system 1601 through an intranet or the Internet.

The computer system 1601 can communicate with one or more remote computer systems through the network 1630. For instance, the computer system 1601 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1601 via the network 1630.

Methods as described herein can be implemented by way of machine (e.g., computer processor) executable code stored on an electronic storage location of the computer system 1601, such as, for example, on the memory 1610 or electronic storage unit 1615. The machine executable or machine readable code can be provided in the form of software. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1601 can include or be in communication with an electronic display 1635 that comprises a user interface (UI) 1640 for providing, for example, the various components (e.g., lab, launch pad, control center, knowledge center, etc) of the model management system. Examples of UI's include, without limitation, a graphical user interface (GUI) and web-based user interface.

One or more microscopes may be provided. The microscopes may be used to collect image data. The microscopes may comprise one or more chips or processors that may aid in capturing image data. The microscopes may be capable of communicating directly with the computer system 1601, or indirectly with the computer system. The computer system may be integrated into one or more microscopes. The microscopes may communicate with a computer system over a network, or directly via one or more hard-wired communication interfaces. The microscopes may communicate with a communication hub that may be directly or indirectly in communication with the computer system. The microscopes may or may not communicate with an adapter that may communicate with the communication hub, or may directly or indirectly be in communication with the computer system. The computer system may be integrated into one or more adapters.

Methods and systems of the present disclosure can be implemented by way of one or more algorithms. An algorithm can be implemented by way of software upon execution by the central processing unit 1605. The algorithm can, for example, aid in the capture of images, allow for pre-processing and/or processing of the one or more images, allow for overlay of the images, allow for co-registration of the images, and/or allow for the display and/or manipulation of the images.

Example 1—Image Acquisition Workflow

This example illustrates one non-limiting approach to the use of the disclosed adapter for collecting one-photon and two-photon images:

1. Place a flat field test target under the adapter. For example, fluorescent beads (~7 µm in diameter) dried onto a microscope slide or onto the end of a straight GRIN probe may be used as a flat field test target.
2. Focus the two-photon microscope while the dichroic mirror on the adapter is positioned out of the light path.

3. Insert the dichroic mirror into the light path.
4. Focus on the test target using the one-photon microscope using the focusing the wheel. The two microscopes are now focused on the same plane. If imaging though a GRIN lens inserted into the tissue, we recommend placing a GRIN lens with the same optical specifications on the test target and aligning the focal planes while imaging though the GRIN lens. This will more accurately compensate for optical aberrations in the GRIN lens.
5. Remove the test target and place the animal (or other samples) under the adapter.
6. Switch to the one-photon microscope and focus on the cell plane of interest.
7. Record one-photon video data (or capture still images) as needed, depending on the experimental goals.
8. Switch to the two-photon microscope and collect a z stack of images (i.e., a series of images wherein the focal plane of each subsequent image is displaced along the z- or optical axis) that contains the same target volume imaged with the one-photon microscope. We recommend collecting images over a z-axis range encompassing at least 50 μm above and below the focal plane of the 1P microscope. This will ensure that the one-photon data captured or recorded falls within the sample volume encompassed by the collected z-stack images. In some instances, one may also collect dynamic volumetric recordings (e.g., recordings of cell firing from multiple cell planes that can then be registered with cells that fired during one-photon imaging. This may make the image contrast obtained for the one-photon and two-photon images more similar, and may enhance the image registration process).
9. Depending on the goals of the experiment, one can image using different indicators that fluoresce at different wavelengths (colors), and which may indicate either static or dynamic processes, or some combination thereof.

Example 2—Image Registration Workflow

One application of the disclosed adapter is for image registration and alignment of the images and/or video data captured or recorded simultaneously (or quasi-simultaneously) from the same sample or subject, e.g., a laboratory animal, using both two-photon and one-photon microscopes. This example illustrates one non-limiting approach used to register the two images:
1. Project the one-photon recording collected over time (i.e., a series of images or video data) into a single image (e.g., by projecting the maximum intensity image data on a pixel-by-pixel basis). We recommend projecting the maximum intensities to ensure that all of the cells that have fired during the recording have been included. The goal is to obtain a single image that shows all of the cells that have fired. Any image correction that may be required, e.g., motion correction, should be performed as necessary prior to the projection step.
2. Bandpass filter the projected image. This will remove the low frequency background and high frequency noise, and enhance the contrast for image registration. We currently use two methods for filtering:
   2a. Gaussian blur. A Gaussian blur of the image (also known as Gaussian smoothing) is subtracted from the original image to remove background, and a second Gaussian blur step is performed to remove high frequency content.
   2b. Gaussian filtering in Fourier space. This approach filters out large "structures" in the image (e.g., performs flat field or shading correction) and small "structures" (e.g., smooths the image) by removing large and small structures of the specified size using Gaussian filtering in Fourier space.
3. Identify the subset of two-photon z-stack images that correspond to the focal depth of the one-photon microscope. The focal depth of the one-photon microscope is much thicker than that for the individual two-photon optical image slices (e.g., the nVista miniature microscope currently has a depth of field of 20 μm, which is an order of magnitude thicker than a typical two-photon image slice). Therefore, the cells visible in the one-photon microscope image recordings may come from multiple planes. A non-limiting example of a method/algorithm for identifying two-photon optical sections that correspond to the one-photon focal depth is as follows:
   3a. Assume an initial guess for the number of two-photon optical slices corresponding to the focal depth of the one-photon microscope. For example, if the one-photon microscope has focal depth of 20 μm, and you have collected z-stacked two-photon images with a z-axis displacement of 3 μm per step (i.e., the optical slices are approximately 3 μm in thickness), the focal depth of the one-photon microscope corresponds to roughly 7 two-photon optical slices.
   3b. Generate a moving projection of two-photon optical slices. For example, project optical slices 1 to 7 into one image, slices 2 to 8 into a next image, slices 3 to 9 into a third image, and so on.
   3c. Bandpass filter the projections using the same filter as used in step 2.
   3d. Calculate the cross-correlation of the one-photon filtered image from step 2 with every image obtained in step 3c to identify the corresponding two-photon image.
4. To align/register the one-photon image and two-photon images identified in step 3d, we use an elastic registration algorithm. The main reason behind using an elastic registration algorithm is that spherical aberrations in the one-photon microscope are spatially different than those in the two-photon microscope. Therefore, the two images need to be aligned using translation, rotation, shear, and elastic deformations. The alignment/registration algorithm that is currently being used is based on vector-spline regularization, as explained in detail in Sorzano, et al. (2005), IEEE Transactions on Biomedical Engineering 52:652-663. Other alignment/registration algorithms have not been tested, but may also be used for this application (see, for example, Maes, et al., IEEE Transactions on Medical Imaging, Vol. 16(2), April 1997). The registration algorithm used primarily relies on minimizing contrast error between the two images. In addition, one can choose a set of one or more landmarks that appear in both images to help facilitate convergence of the algorithm to a single set of coordinate transformations. To obtain higher contrast for cells in the two images, e.g., when registration of dynamic GCaMP activity is desired, we recommend using volumetric imaging of the GCaMP activity. In this approach a time series recording is acquired in each optical slice (volumetric dynamic imaging), therefore, one needs to project recordings both in time and space (z direction). Cell firing will be recorded from multiple cell planes, and then registered with cells that fired during one-photon imaging. This will ensure that the image contrast for the two-photon and one-photon images is comparable, and will facilitate image registration.

5. Record the transformation (mapping) function calculated in step 4 and apply to the non-reference image to align the one-photon and two-photon images. Either image may be used as the reference image however, using the two-photon image as reference may facilitate image registration and further alignment.

6. Apply the mapping function to other corresponding images, e.g., if other channels/fluorophores have been recorded.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing multi-modal imaging using a plurality of microscopes, said method comprising:
   a) receiving functional imaging data and structural imaging data from an adapter, the adapter comprising (i) a first microscope interface configured to optically couple a first microscope to an optical element that is in optical communication with an optical probe to provide the functional imaging data of a sample, and (ii) a second microscope interface configured to optically couple a second microscope to the optical element to provide the structural imaging data of the sample;
   b) processing the functional imaging data, received from the adapter, to generate a first overlaid image;
   c) processing the structural imaging data, received from the adapter, to generate a second overlaid image; d) co-registering the first overlaid image and the second overlaid image,
   wherein said co-registering comprises aligning at least a portion of the first overlaid image and the second overlaid image based at least in part on a coordinate transformation,
   wherein the coordinate transformation is derived based at least in part on a difference in sizes, shapes, positions, or orientations of a landmark feature present both in the first overlaid image and the second overlaid image;
   e) using the difference in sizes, shapes, positions, or orientations the landmark feature in the first overlaid image and that in the second overlaid image to characterize an amount of distortion or warping of the landmark feature between the first overlaid image and the second overlaid image; and
   f) generating a third overlay overlaid image from the first overlaid image and the second overlaid image after said co-registering.

2. The method of claim 1, comprising generating the first overlaid image by obtaining a first cell map, constructing a structural image from a mean projection of a motion corrected movie, and overlaying the cell map with the structural image.

3. The method of claim 1, comprising generating the second overlaid image by obtaining the structural data, using the structural data to generate a 2p/confocal structural image, obtaining functional data, using the functional data to generate a 2p/confocal functional image, and overlaying the 2p/confocal structural image and the 2p/confocal functional image.

4. The method of claim 1, wherein, when said generating, the first overlaid image is set to a first color channel and the second overlaid image is set to a second color channel different from the first color channel.

5. The method of claim 1, wherein the first microscope is a one-photon microscope.

6. The method of claim 1, wherein the second microscope is a two-photon microscope.

7. The method of claim 1, wherein the second microscope is a confocal microscope.

8. The method of claim 1, wherein the first microscope and the second microscope are of different types.

9. The method of claim 1, wherein the first microscope interface is configured to permit the adapter to bear weight of the first microscope.

10. The method of claim 9, wherein the first microscope weighs 20 grams or less.

11. The method of claim 9, wherein the first microscope has a volume of 30 $cm^3$ or less.

12. The method of claim 1, wherein the second microscope interface is configured to permit the adapter to bear weight of the second microscope.

13. The method of claim 1, wherein the first microscope interface and the second microscope interface are provided on a housing.

14. The method of claim 13, wherein the first microscope interface and the second microscope interface are provided on different sides of the housing.

15. The method of claim 13, wherein at least a portion of the optical probe extends out of the housing.

16. The method of claim 1, wherein the optical element is contained within a housing.

17. The method of claim 1, wherein the optical probe is attachable to and separable from the adapter.

18. The method of claim 1, wherein the optical probe comprises a GRIN lens.

19. The method of claim 1, wherein the adapter is configured to cause a first image of the sample generated with the first microscope and a second image of the sample generated with the second microscope to align.

20. The method of claim 1, wherein the first microscope interface and the second adapter interface are configured to allow the adapter to be coupled to and decoupled from the first microscope and the second microscope.

21. The method of claim 1, wherein the second microscope interface is configured to allow the adapter to be coupled to a plurality of different types of microscopes.

22. The method of claim 1, wherein the first microscope or the second microscope is configured to capture three-dimensional data.

23. The method of claim 1, wherein the co-registering the first overlaid image and the second overlaid image comprises dividing the first overlaid image and the second overlaid image into a plurality of sections and performing image registration for each section of the plurality of sections.

24. The method of claim 1, wherein the landmark feature present in the first overlaid image and in the second overlaid image comprises an image of a cell or a neuron, wherein the cell or the neuron has a tuning curve that is generated in response to light stimuli.

25. The method of claim 1, further comprising using the difference in said sizes, shapes, positions, or orientations to train a neural network to determine how a size, a shape, a position, or an orientation of the landmark feature is altered between different optical imaging modalities.

26. The method of claim 25, wherein the neural network comprises a convolutional neural network.

27. A system configured to effectuate multi-modal imaging, the system comprising:
   an adapter comprising (i) a first microscope interface configured to optically couple a first microscope to an optical element that is in optical communication with an optical probe to provide functional imaging data of a sample, and (ii) a second microscope interface configured to optically couple a second microscope to the optical element to provide structural imaging data of the sample; and
   a processor configured
   (i) to process the functional imaging data, received from the adapter, to generate a first overlaid image,
   (ii) to process the structural imaging data, received from the adapter, to generate a second overlaid image,
   (iii) to co-register the first overlaid image and the second overlaid image with the use of aligning at least a portion of the first overlaid image and the second overlaid image based at least in part on a coordinate transformation,
      wherein the coordinate transformation is derived based at least in part on a difference in sizes, shapes, positions, or orientations of a landmark feature present both in the first overlaid image and the second overlaid image;
   (iv) to use the difference in sizes, shapes, positions, or orientations of the landmark feature in the first overlaid image and in the second overlaid image to characterize an amount of distortion or warping of the landmark feature between the first overlaid image and the second overlaid image; and
   (v) to generate a third overlaid image from the first overlaid image and the second overlaid image after said co-registering.

28. The system of claim 27, wherein the processor is configured to generate the first overlaid image by obtaining a first cell map, constructing a structural image from a mean projection of a motion corrected movie, and overlaying the cell map with the structural image.

29. The system of claim 27, wherein the processor is configured to generate the second overlaid image by obtaining structural data, using the structural data to generate a 2p/confocal structural image, obtaining functional data, using the functional data to generate a 2p/confocal functional image, and overlaying the 2p/confocal structural image and the 2p/confocal functional image.

30. The system of claim 27, wherein the processor is configured to set the first overlaid image to a first color channel and the second overlaid image to a second color channel different from the first color channel when generating the third overlaid image.

31. The system of claim 27, wherein the first microscope is a one-photon microscope.

32. The system of claim 27, wherein the second microscope is a two-photon microscope.

33. The system of claim 27, wherein the second microscope is a confocal microscope.

34. The system of claim 27, wherein the first microscope and the second microscope are of different types.

35. The system of claim 27, wherein the first microscope interface is configured to permit the adapter to bear weight of the first microscope.

36. The system of claim 35, wherein the first microscope weighs 20 grams or less.

37. The system of claim 35, wherein the first microscope has a volume of 30 $cm^3$ or less.

38. The system of claim 27, wherein the second microscope interface is configured to permit the adapter to bear weight of the second microscope.

39. The system of claim 27, wherein the first microscope interface and the second microscope interface are provided on a housing.

40. The system of claim 39, wherein the first microscope interface and the second microscope interface are provided on different sides of the housing.

41. The system of claim 27, wherein at least a portion of the optical probe extends out of a housing.

42. The system of claim 27, wherein the optical element is contained within a housing.

43. The system of claim 27, wherein the optical probe is attachable to and separable from the adapter.

44. The system of claim 27, wherein the optical probe comprises a GRIN lens.

45. The system of claim 27, wherein the adapter is configured to cause a first image generated by the first microscope and a second image generated by the second microscope to align.

46. The system of claim 27, wherein the first microscope interface and the second adapter interface are configured to allow the adapter to be coupled to and decoupled from the first microscope and the second microscope.

47. The system of claim 27, wherein the second microscope interface is configured to allow the adapter to be coupled to a plurality of different types of microscopes.

48. The system of claim 27, wherein the first microscope or the second microscope is configured to capture three-dimensional data.

49. The system of claim 27, wherein the processor is configured to co-register the first overlaid image and the second overlaid image by dividing the first overlaid image and the second overlaid image into a plurality of sections and performing image registration for each section of the plurality of sections.

50. The system of claim 27, wherein the landmark feature comprises a cell or a neuron, wherein the cell or the neuron has a tuning curve that is generated in response to light stimuli.

51. The system of claim 27, wherein the processor is configured to use the difference in said sizes, shapes, positions, or orientations of the landmark feature to train a neural network to determine how a size, a shape, a position, or an orientation of the landmark feature is altered between different optical imaging modalities.

52. The system of claim 51, wherein the neural network comprises a convolutional neural network.

* * * * *